US005838389A

United States Patent [19]

Mical et al.

[11] Patent Number: 5,838,389

[45] Date of Patent: Nov. 17, 1998

[54] APPARATUS AND METHOD FOR UPDATING A CLUT DURING HORIZONTAL BLANKING

[75] Inventors: Robert J. Mical, Redwood City; David L. Needle, Alameda; Teju J. Khubchandani, Mountain View, all of Calif.

[73] Assignee: The 3DO Company, Redwood City, Calif.

[21] Appl. No.: 300,867

[22] Filed: Sep. 2, 1994

Related U.S. Application Data

[63] Continuation of Ser. No. 969,994, Nov. 2, 1992, abandoned.

[51] Int. Cl.[6] .................................................. H04N 9/64

[52] U.S. Cl. ......................... 348/650; 348/649; 348/708; 345/199

[58] Field of Search .................................... 348/577, 603, 348/503, 649, 650, 652, 708; 345/199, 431, 515, 516; H04N 9/74, 9/64

[56] References Cited

U.S. PATENT DOCUMENTS

| | | | |
|---|---|---|---|
| 3,900,886 | 8/1975 | Coyle et al. | 358/82 |
| 4,149,184 | 4/1979 | Giddings et al. | 358/81 |
| 4,243,984 | 1/1981 | Ackley et al. | 340/703 |
| 4,247,106 | 1/1981 | Jeffers et al. | 273/85 G |
| 4,418,993 | 12/1983 | Lipton | 352/57 |
| 4,471,465 | 9/1984 | Mayer et al. | 364/900 |
| 4,472,037 | 9/1984 | Lipton | 352/57 |
| 4,521,014 | 6/1985 | Sitrick | 273/1 GC |
| 4,521,770 | 6/1985 | Rhyne | 340/703 |
| 4,523,226 | 6/1985 | Lipton et al. | 358/88 |
| 4,562,463 | 12/1985 | Lipton | 358/88 |
| 4,572,509 | 2/1986 | Sitrick | 273/85 G |
| 4,580,782 | 4/1986 | Ochi | 273/86 R |
| 4,583,117 | 4/1986 | Lipton et al. | 358/92 |
| 4,635,516 | 1/1987 | Giannini et al. | 84/1.01 |
| 4,653,013 | 3/1987 | Collins et al. | 364/518 |
| 4,674,051 | 6/1987 | Fischer | 364/443 |
| 4,731,848 | 3/1988 | Kendall et al. | 381/63 |
| 4,752,893 | 6/1988 | Guttag et al. | 340/798 |
| 4,754,270 | 6/1988 | Murauchi | 340/731 |
| 4,771,279 | 9/1988 | Hannah | 340/801 |
| 4,772,882 | 9/1988 | Mical | 340/709 |
| 4,792,850 | 12/1988 | Liptoh et al. | 358/92 |

(List continued on next page.)

FOREIGN PATENT DOCUMENTS

| | | | |
|---|---|---|---|
| 0 329 418 A2 | 8/1989 | European Pat. Off. | G06F 1/04 |
| 0 437 630 A1 | 7/1991 | European Pat. Off. | G09G 5/36 |
| 0 487 267 A2 | 5/1992 | European Pat. Off. | H04N 9/76 |
| 83/01391 | 4/1983 | WIPO | A63F 9/22 |
| 90/15381 | 12/1990 | WIPO | G06F 3/153 |
| 90/15383 | 12/1990 | WIPO | G06F 9/00 |
| 90/15385 | 12/1990 | WIPO | G06F 12/00 |
| 90/15395 | 12/1990 | WIPO | G06F 15/62 |
| 90/15396 | 12/1990 | WIPO | G06F 15/62 |
| 91/02308 | 2/1991 | WIPO | G06F 9/44 |
| 91/02309 | 2/1991 | WIPO | G06F 9/44 |
| 91/12588 | 8/1991 | WIPO | G06F 15/72 |
| 91/19272 | 12/1991 | WIPO | G06K 9/36 |
| 92/02897 | 2/1992 | WIPO | G06K 9/36 |

OTHER PUBLICATIONS

Van Aken et al., "Color palette chip squeezes 4096 hues out of 4–bit pixels", Electronic Design, vol. 33, No. 30, Dec. 26, 1985, pp. 91–95.

Intel Corporation, 82750DB Display Processor, Specification (Feb. 1991), pp. 1–1 thru 1–56.

Intel Corporation, 82750PB Pixel Processor, Specification (Feb. 1991), pp. 1–57 thru 1–119.

*Primary Examiner*—Sherrie Hsia

*Attorney, Agent, or Firm*—Fliesler, Dubb, Meyer & Lovejoy

[57] ABSTRACT

An apparatus and method for updating a color look up table and expanding video data for use in various applications such as a multimedia computer. The color look up table updating scheme permits selective updating of one entry in the table or up to all of the entries in the table. Updating of the color look up table is preferably performed during the horizontal blanking period. The table may be comprised of two buffers, and a combined output of these two buffers further enhances a multiplicity of colors available to a user.

61 Claims, 14 Drawing Sheets

U.S. PATENT DOCUMENTS 4,799,053 1/1989 Van Aken et al. .................... 345/199
4,805,098 2/1989 Mills, Jr. et al. .................... 364/900
4,814,976 3/1989 Hansen et al. .................... 364/200
4,817,149 3/1989 Myers .................... 381/1
4,823,120 4/1989 Thompson et al. .................... 340/703
4,824,106 4/1989 Ueda et al. .................... 273/1 E
4,827,249 5/1989 Chauvel et al. .................... 340/703
4,841,292 6/1989 Zeno .................... 348/42
4,847,604 7/1989 Doyle .................... 340/706
4,847,608 7/1989 Bouron .................... 340/747
4,857,901 8/1989 Lathrop .................... 340/703
4,879,676 11/1989 Hansen .................... 364/748
4,884,876 12/1989 Lipton et al. .................... 350/347 E
4,905,168 2/1990 McCarthy et al. .................... 364/521
4,907,086 3/1990 Loc Truong .................... 358/183
4,908,858 3/1990 Ohno .................... 381/1
4,918,434 4/1990 Ueda et al. .................... 340/703
4,918,436 4/1990 Johary .................... 340/799
4,931,751 6/1990 Keller et al. .................... 332/108
4,939,672 7/1990 Meadows .................... 364/521
4,951,038 8/1990 Yamamura .................... 340/725
4,951,229 8/1990 DiNicola et al. .................... 364/518
4,951,230 8/1990 Dalrymple et al. .................... 364/521
4,951,232 8/1990 Hannah .................... 364/522
4,952,051 8/1990 Lovell et al. .................... 352/87
4,953,073 8/1990 Moussouris et al. .................... 364/200
4,959,779 9/1990 Weber et al. .................... 364/200
4,960,384 10/1990 Singer et al. .................... 439/155
4,967,268 10/1990 Lipton et al. .................... 358/92
4,969,647 11/1990 Mical et al. .................... 273/85 G
4,974,187 11/1990 Lawton .................... 364/728.01
4,979,033 12/1990 Stephens et al. .................... 358/92
4,982,342 1/1991 Moribe et al. .................... 364/518
4,988,892 1/1991 Needle .................... 307/269
5,014,134 5/1991 Lawton et al. .................... 358/261.3
5,027,270 6/1991 Riordan et al. .................... 364/200
5,038,297 8/1991 Hannah .................... 364/518
5,038,300 8/1991 Seiler et al. .................... 340/703
5,046,097 9/1991 Lowe et al. .................... 381/17
5,051,737 9/1991 Akeley et al. .................... 340/747
5,051,929 9/1991 Tutt et al. .................... 345/199
5,063,441 11/1991 Lipton et al. .................... 358/88
5,068,911 11/1991 Resnikoff et al. .................... 382/56
5,070,479 12/1991 Nakagawa .................... 395/575
5,073,964 12/1991 Resnikoff .................... 382/41
5,081,645 1/1992 Resnikoff et al. .................... 375/1
5,086,295 2/1992 Boettcher et al. .................... 340/703
5,091,717 2/1992 Carrie et al. .................... 340/703
5,091,720 2/1992 Wood .................... 340/721
5,101,446 3/1992 Resnikoff et al. .................... 382/56
5,113,285 5/1992 Franklin et al. .................... 359/465
5,113,490 5/1992 Winget .................... 395/119
5,121,191 6/1992 Cassereau et al. .................... 358/13
5,125,671 6/1992 Ueda et al. .................... 273/437
5,129,060 7/1992 Pfeiffer et al. .................... 395/166
5,132,670 7/1992 Miller .................... 340/703
5,155,768 10/1992 Matsuhara .................... 380/23
5,208,668 5/1993 Dinsel et al. .................... 358/11
5,235,677 8/1993 Needle et al. .................... 395/131

FIG. 13 READ CYCLE WITH RGB/YCC CLUTS

APPARATUS AND METHOD FOR UPDATING A CLUT DURING HORIZONTAL BLANKING

This application is a continuation of Ser. No. 07/969,994, filed Nov. 2, 1992, now abandoned.

CROSS-REFERENCE TO RELATED APPLICATION

This application is related to:

PCT Pat. application Ser. No. PCT/US92/09349, entitled AUDIO/VIDEO COMPUTER ARCHITECTURE, by inventors Mical et al., filed concurrently herewith, Attorney Docket No. MDIO4222, and also to U.S. Pat. application Ser. No. 07/970,308, bearing the same title, same inventors and also filed concurrently herewith;

PCT Pat. application Ser. No. PCT/US92/09342, entitled RESOLUTION ENHANCEMENT FOR VIDEO DISPLAY USING MULTI-LINE INTERPOLATION, by inventors Mical et al., filed concurrently herewith, Attorney Docket No. MDIO3050, and also to U.S. patent application Ser. No. 07/970,287, U.S. Pat. No. 5,481,275 bearing the same title, same inventors and also filed concurrently herewith;

PCT patent application Ser. No. PCT/US92/09348, entitled METHOD FOR GENERATING THREE DIMENSIONAL SOUND, by inventor David C. Platt, filed concurrently herewith, Attorney Docket No. MDIO4220, and also to U.S. patent application Ser. No. 07/970,274, U.S. Pat. No. 5,337,363, bearing the same title, same inventor and also filed concurrently herewith;

PCT patent application Ser. No. PCT/US92/09350, entitled METHOD FOR CONTROLLING A SPRYTE RENDERING PROCESSOR, by inventors Mical et al., filed concurrently herewith, Attorney Docket No. MDIO3040, and also to U.S. patent application Ser. No. 07/970,278, bearing the same title, same inventors and also filed concurrently herewith;

PCT patent application Ser. No. PCT/US92/09462, entitled SPRYTE RENDERING SYSTEM WITH IMPROVED CORNER CALCULATING ENGINE AND IMPROVED POLYGON-PAINT ENGINE, by inventors Needle et al., filed concurrently herewith, Attorney Docket No. MDIO4232, and also to U.S. patent application Ser. No. 07/970,289, bearing the same title, same inventors and also filed concurrently herewith;

PCT patent application Ser. No. PCT/US92/09460, entitled METHOD AND APPARATUS FOR UPDATING A CLUT DURING HORIZONTAL BLANKING, by inventors Mical et al., filed concurrently herewith, Attorney Docket No. MDIO4250, and also to U.S. patent application Ser. No. 07/969,994, bearing the same title, same inventors and also filed concurrently herewith;

PCT patent application Ser. No. PCT/US92/09467, entitled IMPROVED METHOD AND APPARATUS FOR PROCESSING IMAGE DATA, by inventors Mical et al., filed concurrently herewith, Attorney Docket No. MDIO4230, and also to U.S. patent application Ser. No. 07/970,083, U.S. Pat. No. 5,572,235, bearing the same title, same inventors and also filed concurrently herewith; and PCT patent application Ser. No. PCT/US92/09384, entitled PLAYER BUS APPARATUS AND METHOD, by inventors Needle et al., filed concurrently herewith, Attorney Docket No. MDIO4270, and also to U.S. patent application Ser. No. 07/970,157, bearing the same title, same inventors and also filed concurrently herewith.

The related patent applications are all commonly assigned with the present application and are all incorporated herein by reference in their entirety.

BACKGROUND OF THE INVENTION

1. Technical Field

The present invention relates generally to digital image processing and to the generation and display of digital images. More specifically, the present invention relates to reducing the amount of pixel data required to create an image.

2. Description of the Related Art

In recent years, the presentation and prepresentation processing of visual imagery has shifted from what was primarily an analog electronic format to an essentially digital format.

In digital format each picture element (pixel) of a generated image is created by Red(R), Green(G) and Blue (B) image signals delivered to respective RGB video guns. The resolution of each pixel is determined by the number of bits used to represent the colors. For example, if eight (8) bits are used to represent each of the three colors then each pixel may have 28×28×28=224=16,777,216 possible shades. Although such a large number of color possibilities is desirable, eight bits per pixel places a significant strain on available memory and processor resources. The cost of memory and processors which are capable of processing such a large number of color possibilities at acceptable throughput rates is considerable and, therefore, designers of digital image generating systems must necessarily produce systems of low image quality (4–5 bits/color/pixel) to maintain affordability.

One attempt to reduce memory requirements while sustaining eight bit resolution (per color per pixel) has been to use a field of reduced bit size, for example five (5) bits, and to expand this field to 8 bits using a color look up table (hereinafter referred to as "CLUT"). The CLUT is placed downstream of the memory and processor and, therefore, these resources need only be capable of processing 5 bits/color/pixel, which results in a significant increase in throughput rates and a decrease in required memory.

A CLUT is usually random access memory (although other types of memory may be suitable, for example, flash memories) and may operate as follows. The field of reduced bit size, in the above example, 5, is connected to the address lines of the CLUT, providing $2^5$=32 possible input address values per color. This 5 bit input value is converted in the CLUT to an 8 bit expanded value. The specific conversion data for the 5 to 8 bit conversion is specified by the system processor and downloaded to the CLUT. Thus, in this manner, memory and processor resources must process only 5 (R)+5 (G)+5 (B)=15 bits for each pixel, but 8+8+8=24 bits of color data are available per pixel. For a CLUT to provide the desired range of colors, however,the conversion data must be updated. This update must take place during a time period when conversion data is not being read, or in other words, when video data is not streaming out of the CLUT to the video guns.

In many present day low cost computers using VGA integrated circuits, this is done during the vertical blanking period. The vertical blanking period is that period of time between when an electron gun has finished restoring the last line of a field and before it start with the first line of the next field. To fully appreciate the timing implications involved, it is necessary to briefly discuss the generation and display of [video and graphics] images.

It has been determined that a matrix of 500 by 500 pixels is sufficient to create an image which to the human eye appears to have photographic-like continuity (for normal sized computer monitors). The VGA graphics standard, which is used in many present-day low-cost computer systems, approximates this effect with a display matrix having dimensions of 640-by-480 pixels. Standard-definition NTSC broadcast television also approximates this effect with a display technology that relies on interlaced fields with 525 lines per pair of fields and a horizontal scan bandwidth (analog) that is equivalent to approximately 500 RGB colored dots per line.

Images are created using one of two scanning modes known as interlaced or non-interlaced. In interlaced scanning, the electron gun scans every other horizontal line in a first pass and fills in the intervening lines in a second pass. For example, for a frame (one complete screen) of 480 horizontal lines, the odd numbered lines (240) are done during a first pass and the even numbered lines (240) are done during a second pass. In non-interlaced mode, all 480 lines are raster scanned one after the other from top to bottom. Regardless of whether interlaced or non-interlaced mode is used, the electron gun is energized as it draws a horizontal line from left to right (from the perspective of a viewer) and is not energized as it moves from right to left to be in position to draw the next horizontal line. The period in which the electron gun is not energized as it moves from right to left is called the horizontal blanking period. The approximate duration of this period is 11.1 $\mu$s.

After completion of a frame, the electron gun is moved from the lower left hand corner of the screen back to the top right hand corner, in position to begin drawing the next frame. The electron gun is not energized during this period of movement, and as mentioned above, this period is referred to as the vertical blanking period. The approximate duration of the vertical blanking period 1090 $\mu$s.

As pointed out above, conventional prior art display apparatus updated the CLUT during the vertical blanking period. More recent prior art CLUT updating schemes have attempted to modify conversion data during the horizontal blanking period.

In one such attempt, 256 colors are divided into 16 palettes, each containing 16 colors. Each line of horizontal scan data is proceeded by a header that points to one of these 16 palettes. In this manner, 256 color values are available in one color look up table, although one is limited to selecting a predefined table of only 16 entries at a time. This attempt of modifying a color look up table during the horizontal blanking period, illustrates, in part, the difficulty of providing adequate color modification during this period. Furthermore, 256 colors are available per frame, the amount of memory used for the entire color palette is 16 times the amount used during an actual horizontal scan of pixel data.

SUMMARY OF THE INVENTION

Accordingly, it is an object of the present invention to provide complete updating of a color look up table during the horizontal blanking period.

It is another object of the present invention to provide selective updating of the color look up table during the horizontal blanking period.

It is yet another object of the present invention to provide multiple color look up buffers and combine the outputs of these buffers to increase the total number of colors available for projection.

It is still another object of the present invention to simultaneously propagate image data from an independent source and video pixel data to be expanded in the color look up table to project at least a portion of both of these signals on a display.

These and related objects may be achieved through practice of the Apparatus and Method for Updating a CLUT during horizontal blanking herein disclosed. A method and apparatus for updating a CLUT in accordance with the present invention monitors the horizontal scan and blanking periods of an associated display. During the horizontal scan period, video pixel data may be either expanded in the color look up table or bypass the table and be expanded in a bypass unit. The system of the present invention is also capable of simultaneously propagating image data from an independent source such that video pixel data and image data may be simultaneously projected onto different portions of a display. Updating of the CLUT is performed, during the horizontal blanking period. The update scheme is selective and may update the entire table or only a small portion thereof. The CLUT is comprised of two buffers and a combination of the outputs therefrom results in an enhanced number of colors available for projection.

Use of the CLUT apparatus and method of the present invention dramatically increases the number of colors available for projection. How this and other positive results are achieved will become more clear after review of the following Detailed Description.

BRIEF DESCRIPTION OF THE DRAWINGS

The invention will be better understood by reference to the figures of the drawings wherein like numbers denote like parts throughout.

DETAILED DESCRIPTION

The present invention operates in a video image processing and display system such as, but not limited to, that disclosed in the patent applications filed concurrently herewith and listed above.

For purposes of understanding the present invention an overview of a system within which the present invention may be used is presented, followed by a more detailed description the invention.

Figure 1:
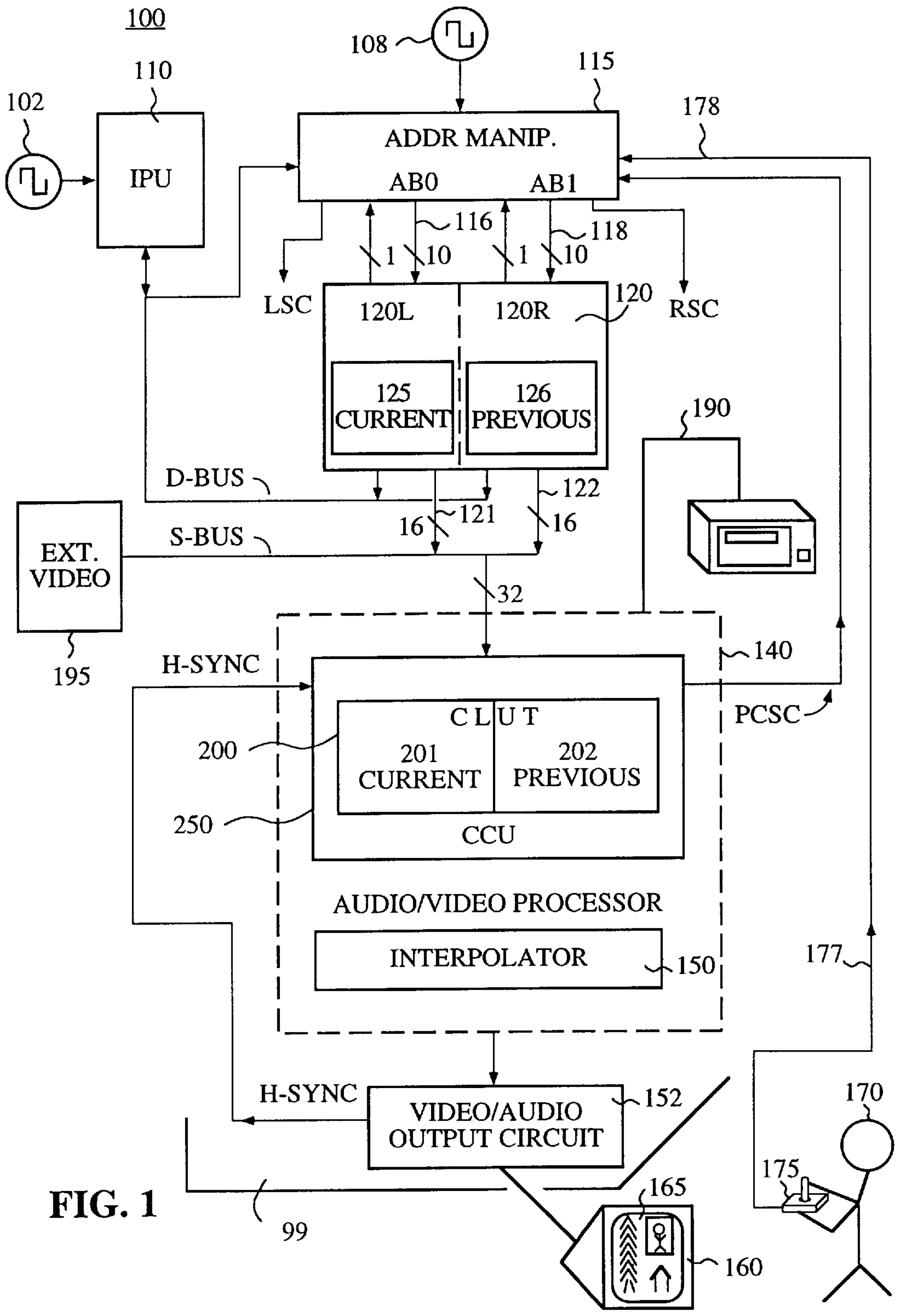
FIG. 1 is a overall block diagram of an audio/video system.

Referring to FIG. 1, a block diagram of a video image processing and display system 100 incorporating the CLUT 200 and CLUT control unit (CCU) 250 of the preferred embodiment is shown. A key feature of such a system 100 is that it is relatively low in cost and yet it provides mechanisms for handling complex image scenes in real time and for displaying them at relatively high resolution. This feature is made possible in part by including a audio/video processor 140 which includes the CLUT 200 and CCU 250 on a single integrated circuit (IC) chip within the system 100.

Except where otherwise stated, all or most parts of system 100 are implemented on a single printed circuit board 99 and the circuit components reside within one or a plurality of integrated circuit (IC) chips mounted to the board 99. Furthermore, except where otherwise stated, all or most of the circuitry is implemented in CMOS (complementary metal-oxide-semiconductor) technology. An off-board power supply (not shown) delivers electrical power to the board 99.

The system 100 includes a real-time image data processing unit (IPU) 110, a video address manipulator 115, a system memory unit 120 having multiple independently-addressable storage banks, the aforementioned audio/video processor 140, a audio/video output circuit 152 and a display unit 160 which may be a home TV. The system 100 may also contain a player bus 178 for connection to an interactive device, such as a joystick 175, permitting an operator 170 to interact with the system 100; an expansion bus 190 for the connection of CD ROM drives and other hardware; and an external audio/video input and control unit 195. In operation, video data is read from system memory 120, in a process controlled by the address manipulator 115, to the CLUT 200. In the CLUT 200 this data is expanded and then sent to the interpolator 150, where it is interpolated from low to high resolution before being output to the audio/video output circuitry for display on the monitor.

The image data processing unit (IPU) 110 is driven by a processor clock generator 102 (50.097896 MHz divided by one or two) operating in synchronism with, but at a higher frequency than an address manipulator clock generator 108 (12.2727 MHz) which is used to clock address signals from the address manipulator 115 to system memory 120. IPU 110 includes a RISC type 25 MHz or 50 MHz ARM60 microprocessor (not shown) available from Advanced RISC Machines Limited of Cambridge, U. K. A plurality of sprite-rendering engines (not shown) and direct memory access (DMA) hardware (not shown) are also provided within the IPU 110.

The IPU 110 accesses binary-coded data (e.g., 125) stored within the system memory 120 and modifies the stored data at a sufficiently high-rate of speed to create the illusion for observer 170 that real-time animation is occurring in the high-resolution image 165 displayed on video display unit 160. In many instances, observer 170 will be interactively affecting the animated image 165 by operating buttons or the joystick or other input means on a control panel 175 that feeds back signals 178 over the player bus 177 representing the observer's real-time responses to the image data processing unit (IPU) 110.

IPU 110 is operatively coupled to the system memory 120 such that the IPU 110 has read/write access to various control and image data structures stored within system memory 120 either on a cycle-steal basis or on an independent access basis. For purposes of the disclosed invention, the internal structure of IPU 110 is immaterial. Any means for loading and modifying the contents of system memory 120 at sufficient speed to produce an animated low-resolution image data structure 125 of the type described below will do.

The system memory 120 has the minimum capacity for the present application to store 2 megabyte of data, but it can be expanded to 16 megabytes. Two megabytes are preferred but not an absolute minimum or maximum storage capacity. The system will work with a system memory of larger or smaller capacity also. Illustratively, the system memory is composed of one megabyte of video RAM (VRAM) and one megabyte of DRAM. The megabyte of VRAM is needed to store a current and previous frame buffer (2×153600 bytes, described below) and the remaining megabyte may also be VRAM, but DRAM is used because it is less expensive. Other memory devices, such as flash memories, may also be suitable for use in place of RAM. Regardless of the type of memory utilized, system memory access time should be small enough to meet the demands of the address manipulator clock generator 108 and processor clock 102.

Physically, the system memory 120 is split into left and right independently addressable banks 120L,120R where each bank has its own address port and 16-bit wide data port. This gives hardware devices, such as the CLUT 200 and CCU 250, simultaneous access to two separately addressable 16-bit "halfwords" within system memory 120. In most instances, such as when the image data processing unit (IPU) 110 is accessing data within system memory 120, the same address is applied to both banks of the system memory 120, and accordingly, the system memory 120 functions as a unitary 32-bit wide word-storing system. When the resolution-enhancing subsystem 150 is fetching data out of system memory 120, however, the left-bank address word $AB_O$ can be different from the right-bank address word $AB_1$. They can also be the same when desired.

System memory 120 is programmed to contain image-defining data in a variety of system memory address regions, including the low-resolution, current frame-buffer region (cFB) 125. The system memory 120 also contains image-rendering control data in other regions (not shown), instruction code for execution by the IPU 110 in yet other regions (not shown) and color palette for a CLUT download (not shown). In addition to current frame-buffer region (cFB) 125, the system memory 120 will often contain one or more alternate frame-buffer regions, such as the previous frame buffer (pFB) 126, storing low-resolution image data of similar structure to that stored in the current frame-buffer region (cFB) 125. The size of each frame buffer is 2 bytes (16 bits)×320 bytes per line ×240 lines=153600 bytes.

If desired, system memory 120 can also store high resolution image data (640×480 pixel) from an external video source. Video from an external source is usually analog and it is normally converted to high resolution (640×480) digital data. External video may also be input directly to the audio/video processor 140, bypassing system memory 120.

To enhance access time, system memory 120 is divided into "pages" and each page is 512×32 (one word) bits in size. Since system memory 120 in the present embodiment has 1 megabyte of memory, there are 512 pages. The pages are allocated such that they conceptually form a stack of 512 pages, at least a portion of which is equally split between the left bank and the right bank. A row address is decoded to select one of the 512 pages and a column address is decoded to select one of the 512 words. The selected 32 bit word is then placed on the appropriate system bus. The procedure in which data is transferred from system memory 120 to a system wide bus is described in more detail in copending U.S. patent application Ser. No.07/970,308, filed concurrently herewith.

The system 100 has two system wide buses: an S-bus and a D-bus which pass control signals and data between components in system 100. The D-bus is utilized primarily for the transmission of data (including instructions) between the IPU and system memory either under the control of a CPM in the IPU or by DMA. The S-bus is used for the transmission of several types of data and control signals primarily from the system memory 120 to the audio/video processor 140; and the circuitry to process these signals in the audio/video processor 140 forms an important part of the present invention. A first of these signals is CLUT color palette data for a new CLUT download. The term color palette is used hereinafter to describe conversion data. A second type is video pixel data which is read out from system memory 120 in real-time and either is expanded by the CLUT 200 or bypasses the CLUT 200. A third type is control signals, hereinafter referred to as "display commands" which designate, among others, whether the CLUT 200 will be bypassed, whether horizontal and/or vertical interpolation will be invoked, etc.

When the CLUT 200 is not being bypassed and is not being copied or updated during the H blanking period, the CLUT 200 is operating under "read" conditions, which for purposes of this disclosure will mean that video pixel data is being read out of the system memory 120, being expanded by the CLUT 200 and sent to the interpolator 150 to be enhanced from low resolution to high resolution. Although the interpolator 150 is selectively capable of performing either no interpolation, only vertical (V) interpolation, only horizontal (H) interpolation or both vertical and horizontal (V and H) interpolation, enhancement from lowest to highest resolution requires both V and H interpolation. This most stringent of cases will be briefly discussed to illustrate which signals the CLUT 200 and CCU 250 must output to the interpolator 150.

The system memory 120, as stated above, is divided into a right and left half, each capable of simultaneously placing a 16 bit "halfword" of pixel defining data on the S-bus. A frame buffer 125 is created in both the left and right memory banks 120L,120R and these frame buffers are arbitrarily designated either current or previous. The current and previous frame buffers 125,126 are used during the interpolation process to enhance the number of color available to the system 100, the total number being a product of interpolator 150 mathematics, described in detail in the aforementioned U.S. patent application entitled RESOLUTION ENHANCEMENT FOR VIDEO DISPLAY USING MULTI-LINE INTERPOLATION, filed Nov. 2, 1992, having Ser. No. 07/970,287, U.S. Pat. No. 5,481,275. Each frame buffer contains 76800 16 bit halfwords of video pixel data which is enough to complete one full screen or "frame" of video data. If both V and H interpolation are to be performed, each of these halfwords contains 5 bits of green, 5 bits of red, 4 bits of blue and two subposition bits that indicate the quadrant for which the given pixel information is to be used. (Note that in single axis only interpolation, 5 bits are used to present blue and only one bit is used for interpolation purposes).

During each read of video image data from system memory 120, two pixel defining halfword signals, Rx(LRo) and Px(LR1), may be place on to the S-bus via respective system memory output buses 121,122, in response to respective serial clock signals LSC, RSC the audio/video processor from (140). From these buses 121,122, pixel-defining halfwords are transmitted over the S-bus to the CLUT 200.

The CLUT 200 contains, in effect, two color lookup tables: a current CLUT 201 and a previous CLUT 202. As was the case with the frame buffers 125,126, the "previous" and "current" CLUT designations are also arbitrary. However, video pixel data read from the previous frame buffer 126 accesses only the previous CLUT 202 and video pixel data read from the current frame buffer 125 accesses only the current CLUT 201. The first 32 bit word of video pixel data will contain the definition for the first previous frame buffer pixel and the first current frame buffer pixel.

The 16 bit halfword from the previous frame buffer 126 is processed first, from which up to two bits of interpolation data may be stripped off and sent to the interpolator 150. The 5 bits of green, 5 bits of red and 4 bits of blue (in V and H interpolation) are sent to the previous CLUT 202 where they are each expanded to 8 bits and those expanded values are read out to the interpolator 150 such that they arrive synchronously with the two subposition bits. The first current frame buffer pixel is then processed, and in a similar manner, the two sub-positions bits may be stripped off and the remaining 14 bits are sent to the current CLUT 201 where they are expanded to 24 bits and sent in synchronicity with the two sub-position bits to the interpolator 150. Continuing this process, the interpolator 150 receives a first previous pixel, a first current pixel, a second previous pixel, a second current pixel, etc. Each pair of previous and current pixels is aligned in time to perform V interpolation and sequentially adjacent pixels are aligned to perform H interpolation.

It is important to reiterate that although V and H interpolation are illustrated to introduce one design consideration of the present invention, it is merely one mode amongst many of operating the present invention.

Figure 2:
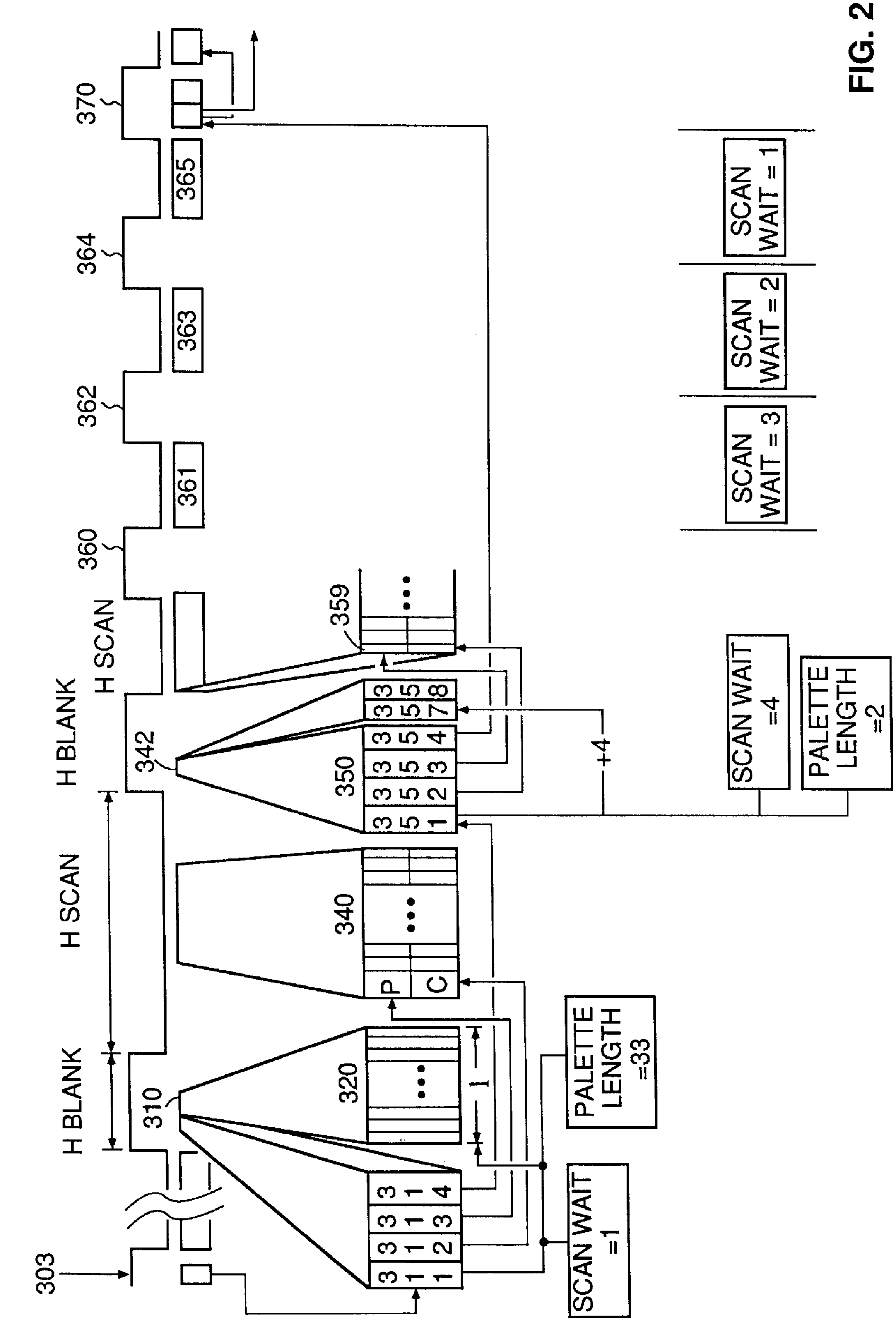
FIG. 2 is a diagram illustrating the relationship between the horizontal scan period and the horizontal blanking period and their correspondence to CLUT download and video data read.

Referring to FIG. 2 a diagram illustrating the relationship between the horizontal scan period and the horizontal blanking period and their correspondence to CLUT download and video data read is shown. This Diagram 300 illustrates a variety of CLUT download scenarios.

A significant aspect of the present invention is that the CLUT may be downloaded with completely new color palette data during each horizontal blanking period. The general CLUT download process is now described.

The address manipulator 115 contains a horizontal counter which counts clock ticks starting at the beginning of a horizontal scan. After a predefined number of ticks is reached the address manipulator 115 knows that the S-bus is available for a CLUT list transfer and one is then begun, if so desired. A CLUT list consists of an initial group of control words followed by color palette and/or display command words. For the first line of each frame the CLUT 200 is forced to a certain predefined value. This has no affect, however, on the image viewed on the monitor/60 because the audio/video output circuit 152 does not create an image during the first four horizontal lines. Beginning with the horizontal line blanking period following the scan of line four, a CLUT download of valid CLUT data may occur. This limitation of the audio/video output circuitry not creating an image on lines 1–4 is simply a limitation of the audio/video output circuit 152, and is not a limitation on the use of the invention.

To control CLUT downloads, the address manipulator 115 contains several registers which include, among others, a CLUT list address register (the CLUT list contains color palette words), the current frame buffer address register and the previous frame buffer address register. Physically, these registers point to locations in RAM. In response to the horizontal tick counter reading the specified CLUT download count, the address manipulator 115 requests control of the D-bus and sends the address in the CLUT list address register over its address lines 116,118 to system memory 120. The first four words at this location are the CLUT list download control words and they are read during four ticks of bus time granted to the CLUT list download process. The CLUT list address in the CLUT list address register is then updated to point to the subsequent CLUT list data word which will be either a color control word or a display command word.

The four control words 310 accessed by the address manipulator 115 are given below in the order accessed.

CLUT DMA control word 1 bit bit 22, enables Slip Stream capture during H-blanking period.

1 bit bit 21, enables operation of video DMA.

1 bit bit 20, enables one of two DMA channels for slipstream image or command data.

1 bit bit 19, sets a video mode for the upcoming scan lines to indicate whether 240 or 480 pixels will be provided 1 bit bit 18, indicates whether the "next CLUT list address" is absolute or relative 1 bit bit 17, specifies whether the "previous line video address" for subsequent scan lines is to be calculated by adding a modulo or by re-using each previously used "current line video address"

1 bit bit 16, indicates the validity of the "current line video address" (0 means use normally incremented "current line video address", 1 means use new address included in current CLUT list)

1 bit bit 15, indicates the validity of the "previous line video address" (0 means use normally incremented "previous line video address", 1 means use new address included in current CLUT list)

6 bits bits 14–9, indicate the length in words give left of this list −4 (−4 because 4 words already loaded in current load)

9 bits bits 0–8, indicate the number of scan lines to wait before processing the next CLUT list Current Frame Buffer Address Physical address from which to begin fetching "current" line pixel data after processing this CLUT list.

Previous Frame Buffer Address

Physical address from which to begin fetching "previous" line pixel data after processing this CLUT list.

Next CLUT List Address

Address from which the next CLUT list should be fetched, after the number of scan lines specified in the CLUT DMA control word have been transmitted. The next CLUT list address can be either absolute or relative.

Two fields in the CLUT DMA control word 311,315 which are particularly relevant to FIG. 2, are the CLUT list length (bits 14–9) and scan wait (bits 8–0). As the name implies, the CLUT list length indicates the number of 32 bit color or command words in the immediately succeeding CLUT list or in other words, the number of conversion data words to be downloaded to the display path. The scan wait indicates the number of scan lines that this conversion data will be used for, which is also the number of horizontal blanking periods −1 to skip without performing a download.

It is important to note that a CLUT list may update a CLUT entirely or selectively. Entirely, in this instance, means that new color data is written to each of the three individual color tables at every address. Selectively means that new color data is written to all of the individual color tables at some addresses or to only one individual color table at only one address or some combination therebetween. The data structure of a color word helps to conceptually illustrate how these discriminating downloads are achieved. A discussion of the circuitry that processes these words is given below, beginning with FIG. 3.

CLUT List Word

Bit 31 indicates whether the word is a color palette word or a display control (command) word. Bit 31 is 0 for a color word. The following bit descriptions (Bits 30–0) are only valid when bit 31=0.

Bits 30–29 are write enable selector bits. 00= write to all three CLUTs. 01= write blue only. 10= write green only. 11= write red only.

Bits 28–24 are the five bit address of CLUT.

Bits 23–16 are the eight bits of red color with bit 23 as the most significant.

Bits 15–8 are the eight bits of green color with bit 15 as the most significant.

Bits 7–0 are the eight bits of blue color with bit 7 as the most significant.

Bit 31 will always be zero for a color palette word. A 1 in bit 31 indicates a display command word for audio/video processor 140 or for the audio/video output circuit 152, discussed further below.

Bits 30–29 are write enable bits and indicate if the color bits 0–23 will be written to all three color tables or to one of the three individual color tables.

Bits 28–24 indicate one of the CLUT's possible 32 addresses. The same five bits are delivered to each of the RGB individual CLUTs. The remaining twenty four bits indicate the actual eight bit conversion value for the five bit address and are allocated as disclosed above.

As stated above, the number of the CLUT list words in each transfer is indicated in the CLUT DMA control word 311,315.

A second field in the CLUT DMA control word, also mentioned above, is the scan wait field. The scan wait field permits a CLUT list download for every horizontal scan line, for a specific selection of scan lines or simply one download for an entire field. These possibilities are better illustrated in FIG. 2 and the discussion which follows.

Block 310 represents CLUT color palette and command words which will be processed during a horizontal blanking period. At the end of the scanning period for the preceding scan line, Block 310 is accessed by the address manipulator 115 in a manner described above. The address for this Block 310 is given by the CLUT list address register which is loaded with the appropriate address during forced CLUT 303. Word 311 is the CLUT DMA control word and contains those fields listed above. Word 312 and 313 are the current frame buffer address and previous frame buffer address respectively. Word 314 is the next CLUT list address which points to Block 342 in the example of FIG. 2.

For purposes of illustrating the versatility of downloads in the present invention, two examples will be given. The first illustrates a complete CLUT download for one scan line and a second illustrates download of only two separate locations in individual color tables. The individual color tables (210–211) are described in more detail below with reference to FIG. 8.

In the first example, a complete CLUT download for a duration of one scan line, the CLUT DMA, control word 311 will contain a 1 in the scan wait field because no horizontal blanking periods will be skipped before the next CLUT download and a length of 33 (32 color entries and 1 background entry) will be in the palette length field, thus indicating the number of color palette words in Block 320. Control word 312 will point to the first halfword in the current frame buffer and control word 313 will point to the first halfword in the previous frame buffer in Block 340. The address manipulator 115 then begins a DMA transfer of the 33 CLUT color words from system memory 120 to CLUT control unit 250. Since, in this example, a complete CLUT download is being performed, bits 30–29 in each color palette data word will be 00, causing the color value bits 0–23 to be written to the CLUT 201. The contents of next color palette address word 311 is written over the old color palette address in the color palette address register. Having completed the CLUT download and having updated the necessary address pointers, the CLUT 200 is ready for the next read out of video pixel data from system memory 120.

The read out process is again controlled by the address manipulator 115 and initiated by a horizontal synchronization signal sent by the audio/video processor 140. During a transfer, 32 bits at a time are shifted out of system memory. The first 32 bit word transferred contains the first halfword from the previous frame buffer and the second word transferred contains the first halfword from the current frame buffer. In this manner, alternate 16 bits half words pass through the current look up table 201 and previous look up table 202 where their color representation is expanded to 24 bits per pixel. The interpolator 150 then receives the first pixel of the previous scan line, the first pixel of the current scan line, the second pixel of the previous scan line, the second pixel of the current scan line, etc. such that the interpolator 150 may perform both horizontal and vertical interpolation. Towards the end of the horizontal scan count, the address manipulator 115 begins the next CLUT color palette download. The scan wait register is interrogated and since it is one, indicating that no lines should be skipped before the next CLUT download, the address interpolator 150 begins the data transfer and the next four CLUT download control words 315–354 are loaded into the address manipulator 115. In this example, only two values in the CLUT table 201 are to be changed and the newly configured CLUT 201 is to be used for the next four scan lines. Accordingly, the contents of palette length register is 2 and the contents of scan wait is 4 (there are three horizontal blanking periods between four scan lines). As in the above example, the DMA transfer begins and continues until the palette length register contains 0, indicating that 2 color palette data words 357, 358 have been transferred. Continuing with the second example, color palette data word 357 will change only one word in the blue color table. To do this, bits 30–29 will read 01, activating a write enable of the blue CLUT 212 (of FIG. 8) and the value of bits 23–17 will be written to the memory location specified by bits 28–24. The other least significant bits in this case are don't cares. Similarly, color palette data word 358 will change one word in the green look up table. According, bits 30–29 are 1, 0 and bits 15–8 give the value to be written to the location indicated by the address bits.

The download is completed and new palette address word 354 updates the next color palette address register to point to the location of the next color palette. Since four scan lines will be drawn on the current CLUT information, the next CLUT download will not take place for another horizontal blanking periods. The contents of word 354, therefore, points to the color palette to be accessed during horizontal blanking period 370. Towards the end of the horizontal count used to scan Block 359 (only partially shown), the address manipulator 115 interrogates the scan wait register to see if it is one. The scan line register equals 4, in our present example, indicating that three horizontal blanking periods are to be skipped until the next color palette transfer. The scan line register is then decremented by 1.

Figure 3:
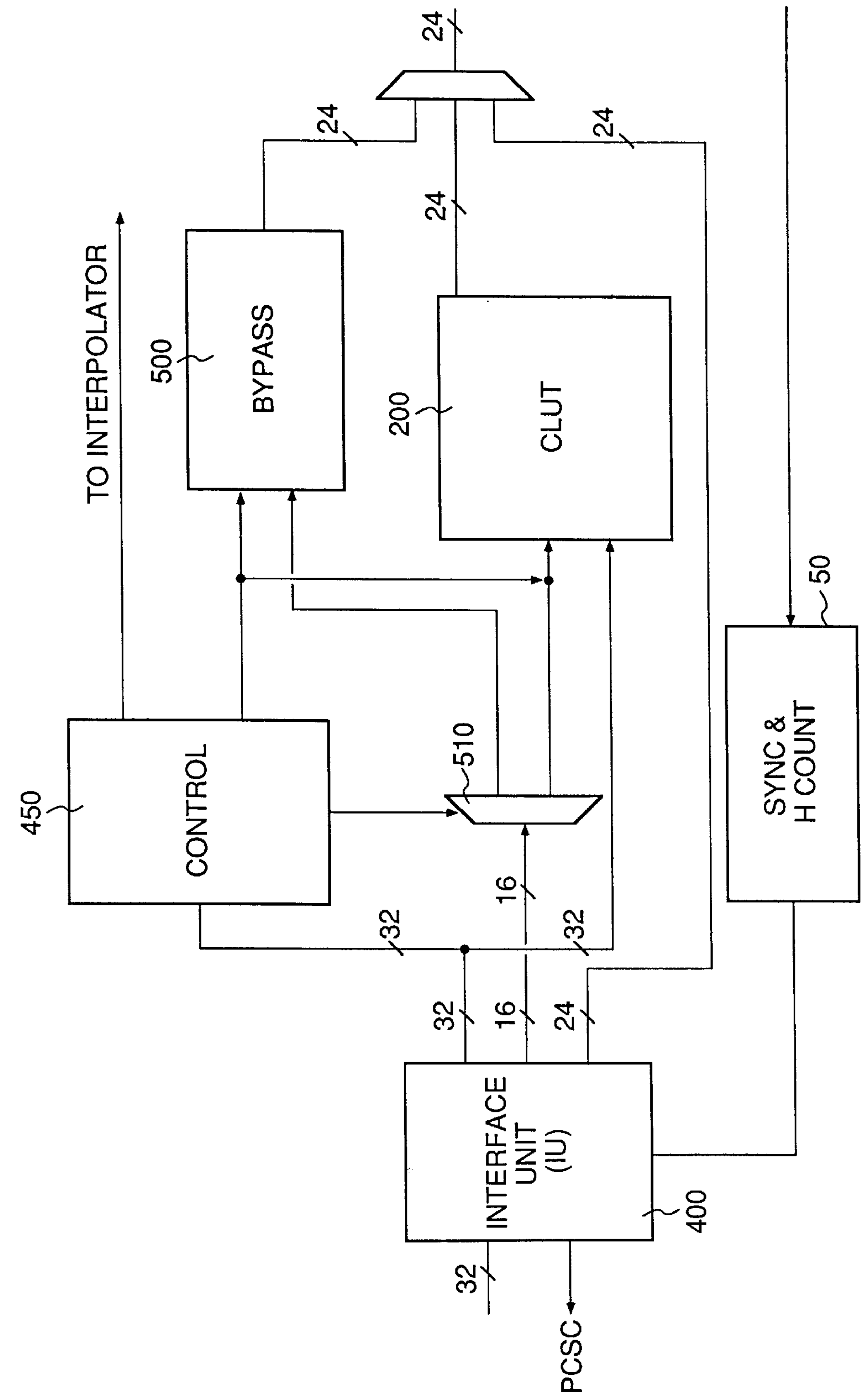
FIG. 3 is a block diagram of CLUT control unit.

During the horizontal blanking period 362, as was the case during the horizontal blanking period 360, the scan wait register is decremented and the next line of scan data, which is continuously arranged in memory, is processed. This procedure is again repeated during horizontal blanking time 364 until the scan wait register is decremented to one. When the fourth horizontal blanking period 370 occurs, the scan wait register is interrogated and upon a finding of contents =1, a CLUT download is initiated. The address manipulator 115 accesses the control words pointed to by the color palette address register (which was provided by word 354), and a CLUT download takes place as described above. At this time, a color palette data transfer takes place, the initial control words pointing to the subsequent current and previous frame buffer addresses and to the address for the next color palette. Referring to FIG. 3, a schematic view of the CLUT control unit 250 having the CLUT 200 therein is shown. The 32 bit S-bus is connected to the CCU 250 at interface unit (IU) 400. Digital logic is provided inside the IU 400 to divide the 32 bit input into one of three outputs. The first of these outputs is a 32 bit word connected to either the control unit 450 or the CLUT 200. The second output is 16 bits of video pixel data and subposition bits and is connected to a demultiplexer 510 from which it may be selected as an input to the CLUT 200 or the bypass circuit 500. The third output of the IU 400 is 24 bits of slip-stream data which are propagated to the interpolator 150.

The control unit 450 latches display command words which are output to the CLUT control unit 250, to the interpolator 150 and to the audio/video output circuit 152. A bypass circuit 500 is provided to expand the 15 bits of video pixel data into 24 bits, in those situations when it is desirable not to use the clut 200. A synchronization and horizontal counter unit 50 is provided to perform synchronization amongst the address manipulator 115, the audio/video processor 150 and the audio/video output circuitry 152. Each of these units will now be described in more detail.

Figure 4:
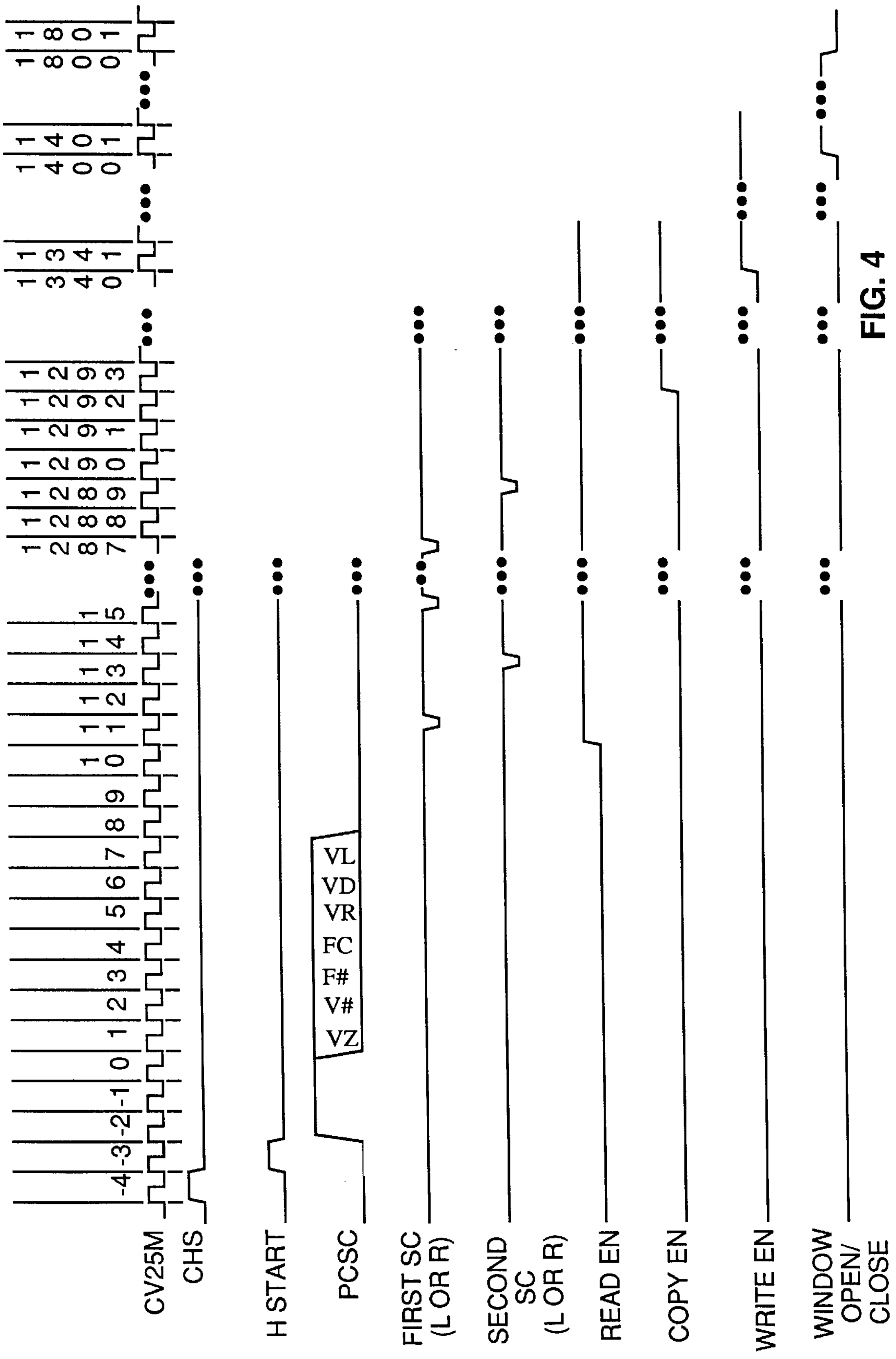
FIG. 4 is a timing diagram indicating the timing of certain events from the perspective of a horizontal scan.

Referring to FIG. 4, a timing diagram for a horizontal scan of pixel data is shown. In viewing FIG. 3, it may be helpful to refer to FIG. 5 in which a schematic view of the horizontal counter and synchronization unit 50 is shown. The circuit 50 is responsible for generating the signals illustrated in FIG. 4.

The audio/video output circuitry 152 generates a horizontal sync signal when it has completed scanning one horizontal line and is now in position to begin scanning the next horizontal line. In gate 51, this horizontal sync signal is ANDed with the exclusively ORed output of two horizontal count decoders 74 and 76. An exclusive OR 77 outputs a signal defining a window in which the audio/video processor 140 will acknowledge a horizontal sync from the audio/video output circuitry 152. The output of gate 51 is the circuit horizontal sync signal (CHS). This signal is input to a D flip-flop 52 and output as H start. H start is gated through two additional sequentially arranged flip-flops 53–54 and the outputs of these two sequentially arranged flip-flops 53–54 is input along with H start, to an OR gate 56. The output of OR gate 56 will be clocked high for at least 3 cycles due to the propagation of H start through flip-flops 53 and 54. The output of OR gate 56, which is called PCSC, is transmitted to the address manipulator 115. When the PCSC signal arriving at the address manipulate 115 is high for three consecutive cycles, a horizontal counter (not shown) in the address manipulator is started. The third consecutive logic high from the PSCS also starts a horizontal counter ("H counter") 70 in the synchronization and horizontal count unit 50. In this manner, the address manipulator 113 is synchronized with the audio/video processor 140. The PCSC signal contains several information bits immediately after the three logic high cycles. These logic bits are serially input from a 1 to 8 selector 59 which is enabled by the output of flip-flop 54. Based on a count set by the selector 59, they transmit: VZ, which indicates the first horizontal line of a frame; V#, which is the last bit of vertical count, indicating if a line is odd or even; F#, which indicates either field 0 or field 1; FC, which indicates a forced CLUT; VR, which indicates whether to generate a VIRS monitor test signal; VD, which indicates NTSC or PAL format; VL, which indicates the last horizontal line of a frame.

Figure 5:
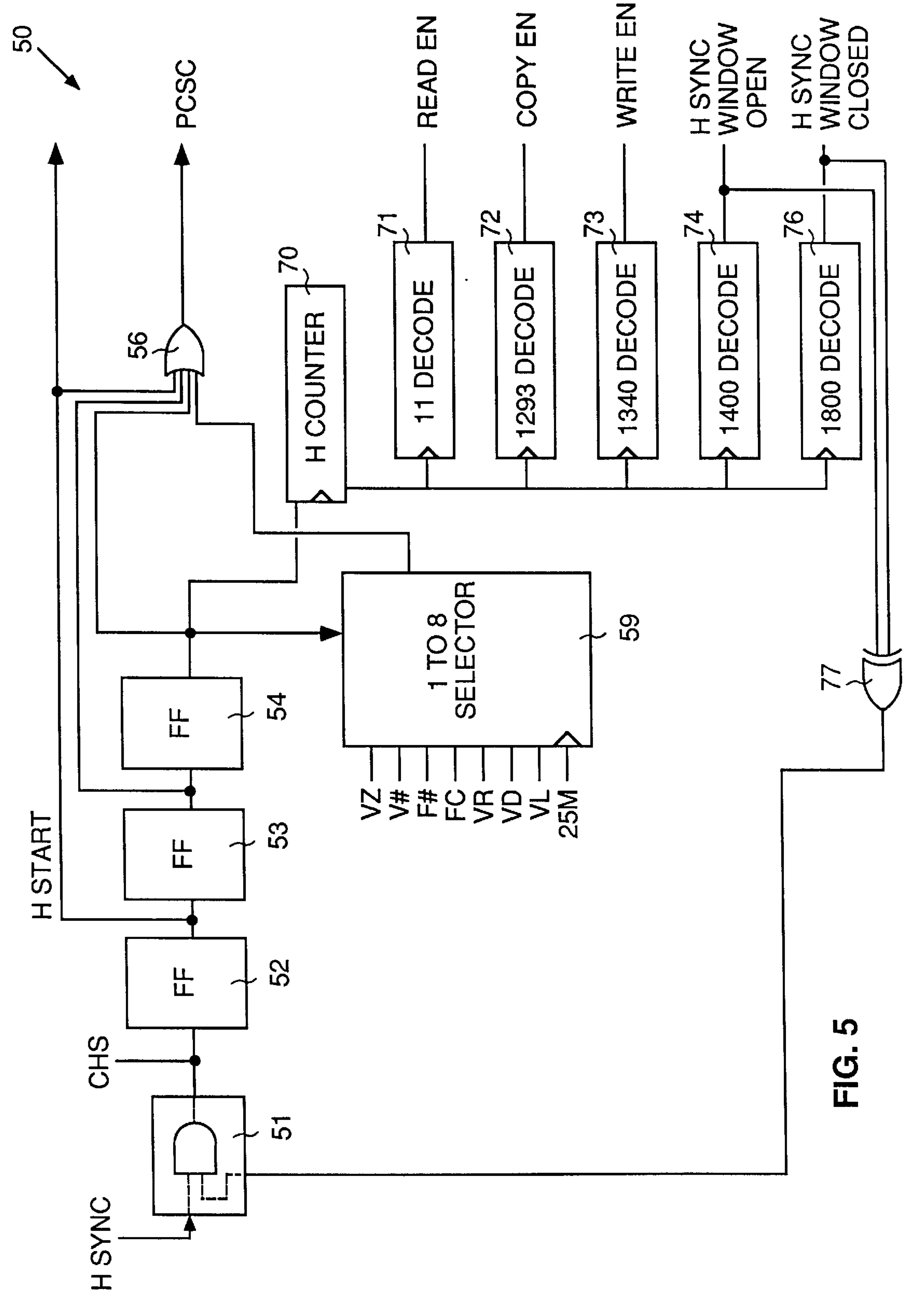
FIG. 5 is a schematic/block diagram of the synchronization and horizontal count unit.

The time line of FIG. 5 may be divided into four sections: synchronization, read, copy and write. The synchronization section, described immediately above, begins at minus 4 and may last no more than 14 ticks. The read section begins on tick 11 and decoder 71 is configured to detect when H counter 70 has reached a count of 11. Upon this occurrence, the decoder 71 sends a read enable ("Read EN") to several locations in the CCU 250, described below. The address manipulator 115 responds to a horizontal count of 11 in its H counter by sending the first system clock, either an LSC or RSC. Since there are 640 pixels in a high resolution line and each pixel takes two ticks, 1280 ticks are required to scan one horizontal line. Thus, the read period is from the eleventh tick to approximately tick 1290.

A second horizontal decoder 72 decodes when the horizontal counter 70 has reached tick 1293. By tick 1293, the read operation should be complete and the copy enable signal ("COPY EN") is generated by decoder 72. The copy enable signal marks the beginning of the copy section in which the current CLUT is copied to the previous CLUT. The CLUT copy operation should take approximately 36 ticks so that by tick 1340 the CLUT should be available for the download of new color palette data. Decoder 73 is set to detect when the H counter 70 is at 1340, and on the occurrence of this event, the decoder 73 generates a load enable ("Write EN") signal. A clut download should take no more than 50 ticks and therefore all operations should be completed by tick 1400.

A window for the receipt of the horizontal synchronization signal from the audio/video output circuitry 152 is created from tick 1400 to tick 1800. This is performed by setting decoder 73 to 1400 which becomes a logic high when the H counter 70 reaches this count. The output of decoder 70 is propagated through an exclusive OR gate 77 to gate 51 to be ANDed with the horizontal synchronization signal. The decoder 76 is set to determine when H counter 70 has reached a tick count of 1800. Upon the occurrence of this event, the output of decoder 76 becomes logic level high and the exclusive OR 77 goes low disabling gate 51. A signal is also sent to the IPU 110 to indicate that a synchronization signal from the audio/video output circuitry 112 has not been received during the allotted window.

Figure 6:
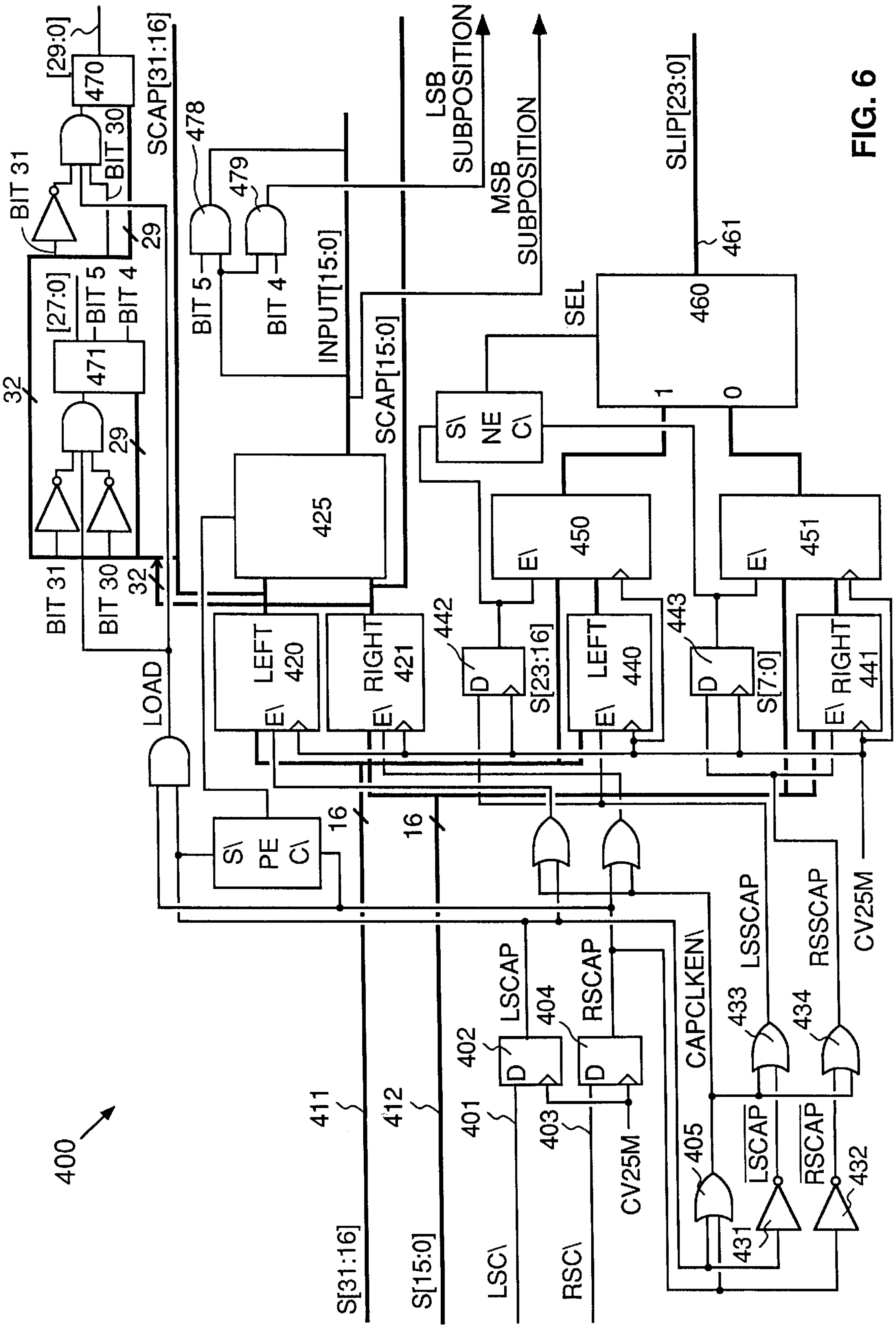
FIG. 6 is a schematic view of an interface unit.

Referring to FIG. 6, a schematic view of the interface unit (IU) 400 is shown and a corresponding timing diagram is provided in FIG. 6. Line 411 transmits the 16 most significant bits of the S-bus and is connected to the data input of the left side register 420. Line 412 transmits the 16 least significant bits and is connected to the data input of the right side register 421. These two registers 420, 421 combine to form a 32 bit S-bus capture register which output the 32 bit wide SCAP signal and are enabled by a signal derived from LSC and RSC from the address manipulator 115, which uses its' own horizontal line counter (not shown) to determine when to send LSC and RSC.

During an S-bus transfer of video pixel data, the address manipulator 115 sends the LPSC signal to the IU 400 to indicate that video data is present on the left side or most significant 16 bits of the S-bus. The RPSC signal is sent to indicate same for the right side or least significant 16 bits. The LPSC is active low and input on line 401 which is connected to D latch 402. RPSC is also active low and is input on line 403 which is connected to D latch 404. The latched versions of these two signals are called LSCAP (for left side capture) and RSCAP (for right side capture), respectively. The outputs of the two gates 402,404 are ORed at gate 405 to produce the capture clock enable signal (CAPCLKEN). The timing of these signals is illustrated in FIG. 7.

Figure 7:
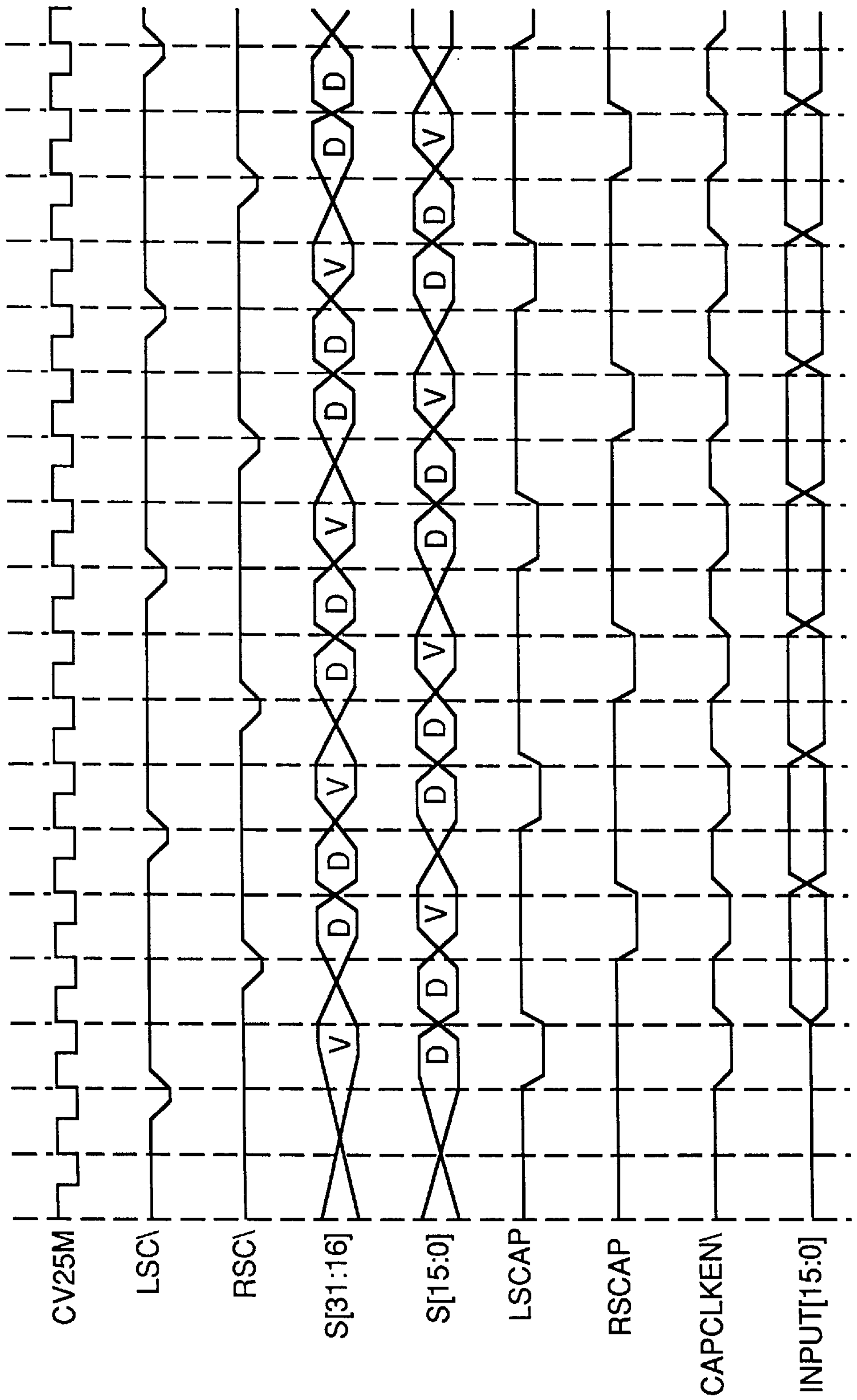
FIG. 7 is a timing diagram to be used in conjunction with FIG. 6.

Registers 420 and 421 are positive edge triggered and referring to FIG. 7, it is seen that the rising edge of LSCAP latches the contents of line 411 in to register 420. The rising edge of RSCAP latches the contents of line 412 in to register 421.

The address manipulator 115 sends only 16 bits of video pixel data over the S-bus per transfer, alternating between the most significant bits and the least significant bits of the bus. That is the reason for separate left and right side registers 420,421 and alternating left and right side capture signals. The left and right side halfwords are now combined by multiplexer 425 into a stream of 16 bit pixel-defining halfwords which are sent over line 426 as Input [15:0]. It is immaterial whether a right side word precedes a left side word or not, but the flow is always previous halfword, current halfword, previous halfword, current halfword, etc.

As mentioned above, the CLUT 200 and CCU 250 may process data for no, V only, H only or V and H interpolation. The information for selecting a interpolation mode is contained in each 16 bit pixel-defining halfword, and is separated in the following matter. The most significant bit [15] of Input [15:0], which indicates one axis of interpolation, is stripped away and delivered to the interpolator 150. The least significant bit [0] of Input [15:0], which can indicate another axis of interpolation and/or the 5th bit of the blue color resolution is stripped away and connected to two AND gates 478 and 479. A second input of AND gate 478 is connected to bit 5 of the command register 471. If bit 5 is active, Input [0] is used as the 5th bit of the blue color resolution. A second input of AND gate 479 is connected to bit 4 of the command register 471. When bit 4 is active, Input [0] is used to select one axis of interpolation. Thus, the least significant bit of Input [15:0] may be used for interpolation, color representation, both or neither.

Since video pixel data is only transmitted 16 bits at a time, there are 16 available bits in each transfer. If it is so desired, these bits may be used for the transfer of slip-stream data. Slip-stream data at low resolution is 16 bits per pixel and in this case a mere 16 bits of slip-stream data could be transferred opposite each 16 bit transfer of video pixel data. High resolution slip-stream is, however, 24 bits wide, necessitating 2 clock ticks to effectuate a transfer. This is feasible, in the IU 400, because 2 clock ticks are used for each 16 bit video pixel data transfer.

The two 16 bit negative edge triggered registers 340,341 are used to latch the first 16 bits of slip-stream data. A negative trigger is used because the slip-stream is most stable during the falling edge of the system clock (see falling edge indicator 439 in FIG. 6). In order to latch on the side opposite of the side containing video pixel data, LSCAP and RSCAP are inverted at gates 431 and 432, respectively, and ORed with CAPCLKEN at gates 433 and 434, respectively. The resultant signals are labelled LSSCAP (left side slip-stream capture) and RSSCAP (right side slip-stream capture) in FIG. 7.

If, for example, there are 16 bits of video pixel data on the left side of the bus, line 411, then the right side of the bus, line 412, will contain a first 16 bits of slip-stream data (during the first clock tick of that transfer cycle). In the same period that LSCAP is latching the video pixel data, RSCAP is latching those first 16 bits of slip-stream. The RSCAP signal, active low, is latched by D flip-flop 445. On the next tick, RSSCAP is presented to the enable of 24 bit register 451 which latches in the 16 slip-stream least significant bits from register 441 and the 8 slip-stream most significant bits from line 412. A similar 16 bit register 440, D flip-flop 442 and 24 bit register 450 are provided to latch slip-stream data in the left side of a 32 bit transfer. Registers 440, 442 and 450 are enabled by LSSCAP.

A 2 to 1 multiplexer 460 is provided to select either the output of left side register 450 or that of the right side register 451 to line 461, from where they propagate sequentially to the interpolator 150.

In the proceeding, we have discussed transfer of video pixel data, which is transmitted 16 bits at a time. In the case of color palette or display command transfer, 32 bits of information are sent. To latch both sides of the bus during a 32 bit transfer, the address manipulator 115 sends simultaneous LSC and RSC signals. The output of the capture register 420, 421 is transmitted as SCAP [31:0] via a 32 bit inch connection to the display command register 470, 471 and to the CLUT for processing of display commands and color palette words. How the circuit 400 determines whether a word is a command control or color word is now discussed.

The two most significant bits of SCAP [31:0] indicated the type of word. Bit 31 determines if a control word is present. Bit 30 determines if the control word is primarily for the audio/video processor 140 or for audio/video output circuit 152. A 0 at bit 31 indicates a color palette data word, in which case registers 470 and 471 do not latch the 32 bit word which propagates as SCAP [31:0] to the CLUT 200.

The two control words are latched by gating them with the load signal, active low. Bit 31 is input to both registers 470, 471 in its inverted form. Bit 30 is inverted for the display command register 471, but not for the audio/video output circuit 152 register 470. If bits 31 and 30 are set, at the occurrence of a load signal, the command signals [29:0] are latched and held in register 471, until a subsequent display command is sent. If bit 31 is set, but bit 30 is not set, then the audio/video output circuit 152 register 470 is enabled and lines [29:0] are latched. The output of register 470 has a connection (not shown) to the audio/video output circuitry 152.

Having described the interface unit 400, the circuitry for processing the signals output from this unit will now be discussed. There are essentially 4 of these and they are video pixel data for a CLUT read (Input [15:0]), color palette data for a CLUT write (SCAP[31:0]), display commands for the audio/video processor 140 and, display commands for the audio/video output circuit 152. The latter are not important for an understanding of the invention and will not be discussed.

Figure 8:
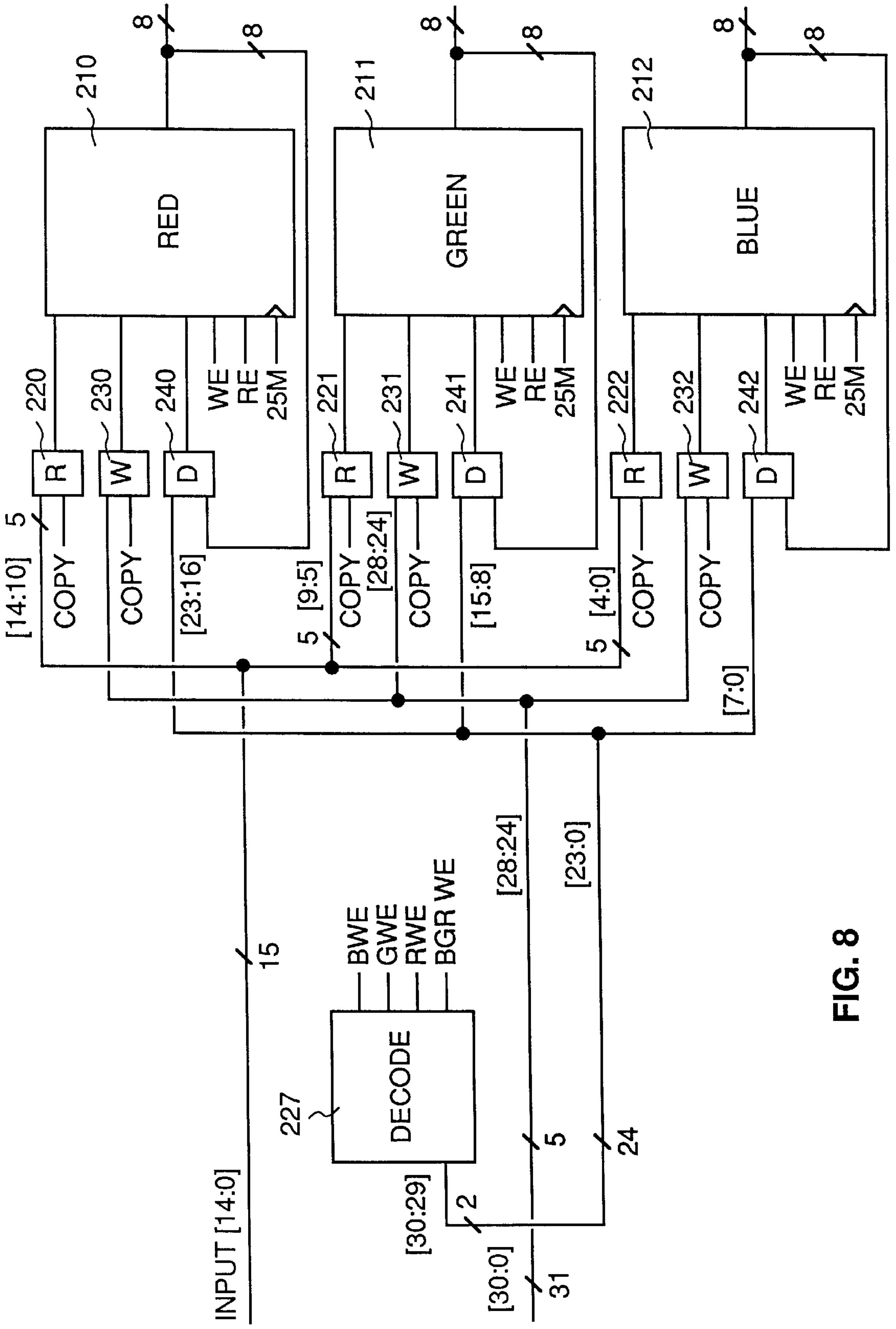
FIG. 8 is a block diagram of a CLUT.
Figure 12:
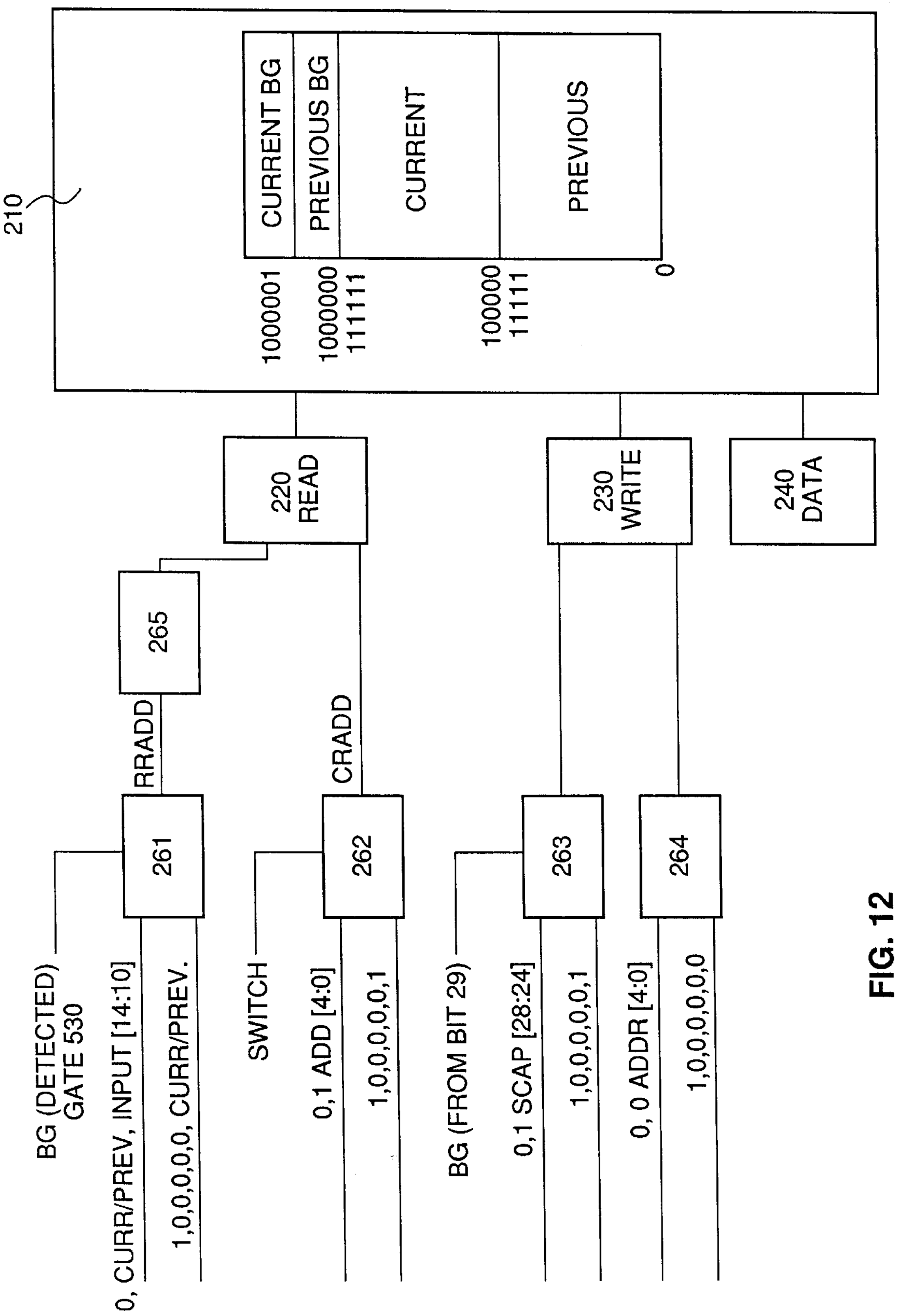
FIG. 12 is a more detailed view of a portion of the CLUT of FIG. 8.

Referring to FIG. 8, a general schematic view of the CLUT 200 hardware is presented. For purposes of clarity, a more detailed description of an individual CLUT 210 is given in FIG. 12. The teachings of FIG. 12 are to be applied to the 2 remaining CLUTs 211 and 212.

The CLUT 200 is divided into three individual CLUTs for its three principle colors: a red CLUT 210, a green CLUT 211 and a blue CLUT 212. Each of these CLUTs 210,211, 212 has associated therewith three 2 to 1 multiplexers: a read address multiplexer 220,221,222; a write address multiplexer 230,231,232 and a data input multiplexer 240,241, 242. Each of the three CLUTS also has separate write and read enables. One should note that the CLUTs 210–212 are shown separately. This is done to facilitate understanding of their operation. The actual embodiment of the CLUTs is as contiguous memory locations in a single RAM.

The two inputs for the read address multiplexer 220–222 are, first, the five bit video pixel data address, [14:10] for the red CLUT 210, [9:5] for the green CLUT 211 and [4:0] or [4:1] for the blue CLUT 212; and second, address lines [6:0] from a copy control circuit (shown and described below) for use during a current to previous color palette copy.

The two inputs for the write address multiplexer 230–232 are, first, address lines [6:0] from a the copy control circuit, and second, bits 28–24 from SCAP [31:0]

The two inputs to the data input multiplexers 240–242 are, first, the 24 bits of color palette data from SCAP [23:0] in which bits [23:16] are input to the red CLUT 210, bits [15:8] are input to the green CLUT 211 and bits [7:0] are input to the blue CLUT 212, and second, the 8 bit [7:0] respective output of each CLUT 210–211 for use during a copy cycle.

Recalling the time line of FIG. 4, the horizontal scan or "read" period of a high resolution line takes approximately 1280 ticks (2 ticks per 640 pixels per line). This period, as well as the CLUT copy and color palette download periods are monitored by the H counter 70 described above with reference to FIG. 5. During the read period, the Read EN line, which is connected to each of the CLUTS 210–212, is enabled and the input select for each read address multiplexers 220–222 is set to select the respective inputs from the 5 bit video pixel data address.

Figure 9:
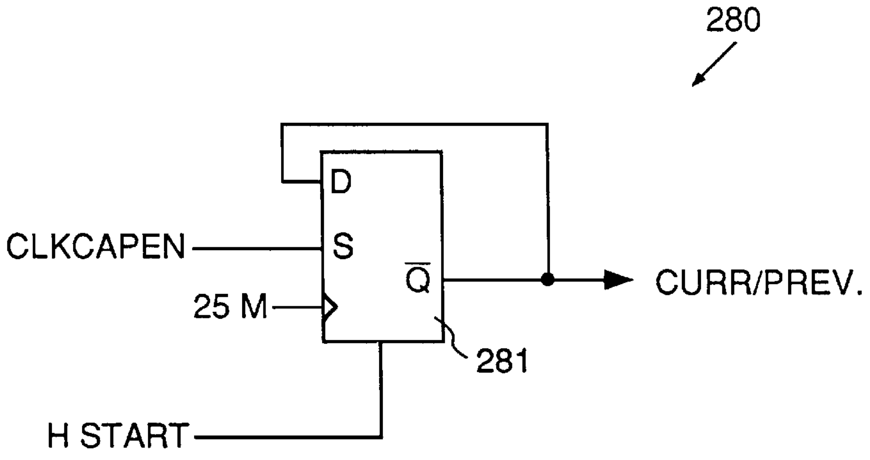
FIG. 9 is a schematic view of a current/previous circuit.

Each of the 5 bits of video pixel data is either for a previous or a current pixel and the LSC and RSC are used to make this determination (see previous/connect circuit 280 of FIG. 9. As stated above, LSC and RSC are sent by the address manipulator each time a left side halfword or right side halfword is sent over the bus. Regardless of which signal comes first, the clock during tick 11 (of FIG. 3) will always be that for a previous video pixel because previous has been designated to come first. A signal indicating previous or current pixel data takes the form of an additional most significant address bit [5] connected to each of the 5 pixel address input lines of the read address multiplexers 220–222. During previous pixel data, this line is pulled low forcing the addressed location in each CLUT 210–212 to be the previous portion.

The other additional address line is a further most significant bit [6] which indicates the location in each CLUT 210–212 for background.

Immediately after the horizontal scan of a line has completed, the horizontal line count is approximately equal to or less than 1292. If a new color palette is to be downloaded, the current portion of the CLUT must be copied to the previous portion so that the current portion is available to receive new color palette data. At tick 1293, the copy decoder 72 is enabled and the appropriate multiplexer 220–222 inputs are selected. Beginning at location 100000 and ending at location 111111, the 32 current color palette bytes of each CLUT 210–212 are read out and in the same clock cycle written back in, starting at location 000000 and ending at 011111.

Following a CLUT copy, the third type of CLUT data transfer, a CLUT download, can begin. Much like the CLUT read and CLUT copy, the CLUT download or write enable signal ("Write EN") is generated for a certain period of ticks along the horizontal time line (somewhere between 1340 and 1400). In a download, each 32 bit color palette data word is sent to the CLUT 32. Bits 30,29 are connected to a decoder 227 which decodes whether a write will be made to all CLUTs or only blue 212, only green 211 or only red 210. The outputs of the decoder 227 are attached to the appropriate write enables of the CLUTs 210–212 and ANDed with the Write EN signal (not shown) to enable the appropriate multiplexers 230–232. The data lines SCAP [23:0] are connected to the CLUTs as specified above.

To facilitate a better understanding of how the various multiplexer inputs are selected at the appropriate times and how the appropriate address signals are transmitted to the multiplexers, a discussion of previous/current, read and copy circuitry is now presented.

Referring to FIG. 9, a circuit for determining whether a 16 bit half word propagating over line 426 (input[14:0]) contains video pixel data for a previous or current pixel (not shown). The circuit essentially consists of a D flip-flop 281 which is set by the CAPCLKEN signal. CAPCLKEN is used because it indicates the first occurrence of an LSC or RSC regardless of their sequential order. The gate 281 is enabled by the H start signal which must necessarily occur before the first LSC or RSC. The inverting output of the gate 281 is fed back to the D input to ensure that the output signal remains in the same state for two clock ticks. This is done because a new previous or current halfword is only available every other tick.

Figure 10:
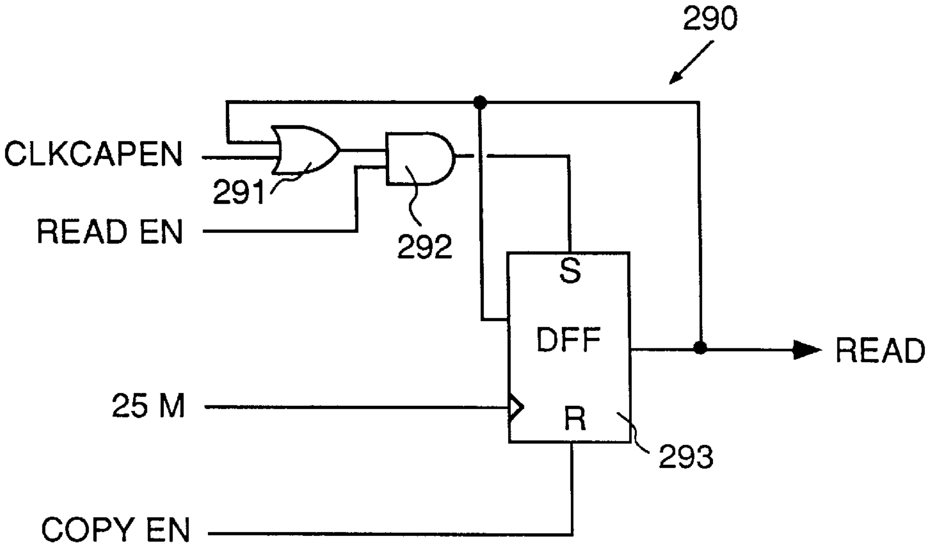
FIG. 10 is a schematic view of a read enable circuit.

Referring to FIG. 10, a read select circuit 290 is shown. The read select circuit 290 has the function of selecting which input of the read multiplexers 220–222 will be selected for propagation to the clut 200. The CAPCLKEN is again used because it indicates the occurrence of an LSC or RSC. However, for read select, we are only concerned about this signal when it occurs after a read enable. Therefore, these two signal are ANDed together at gate 292 and input as the set command to D flip-flop 293. The output of this flip-flop is fed back through OR gate 291 so that read select, the output of gate 293, remains enabled even when CAPCLKEN changes state. The copy enable signal, copy EN, is connected to the reset input of the D latch 293 to disable the latch once the copy portion of the horizontal time line has begun.

Figure 11:
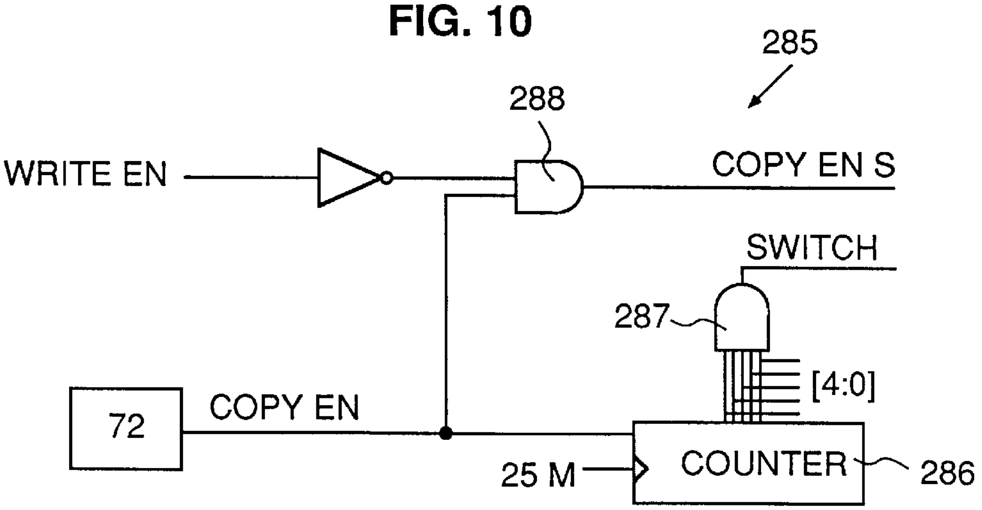
FIG. 11 is a schematic view of a copy control circuit.

Referring to FIG. 11, the copy control circuit 285 is shown. The copy enable signal ("copy EN") is connected from decoder 72 to a 0 to 32 counter 286. This counter 286 generates the 0–31 address [4:0] in each of the previous and current CLUTs. The five output lines which designate address [4:0] are ANDed by five input AND gate 287. When the counter reaches a count of 32, each of the inputs to AND gate 287 are logic high which cause a change in the state of the Switch signal. The Switch signal is used to select between the address generated by counter 286 or background. When the switch signal is logic level high, the background address is selected.

The copy EN input from the decoder 72 is ANDed at gate 288 with the inverted form of write enable ("write EN"). The copy enable select signal ("copy EN S") is valid only when write enable input from decoder 73 is not active.

Figure 14:
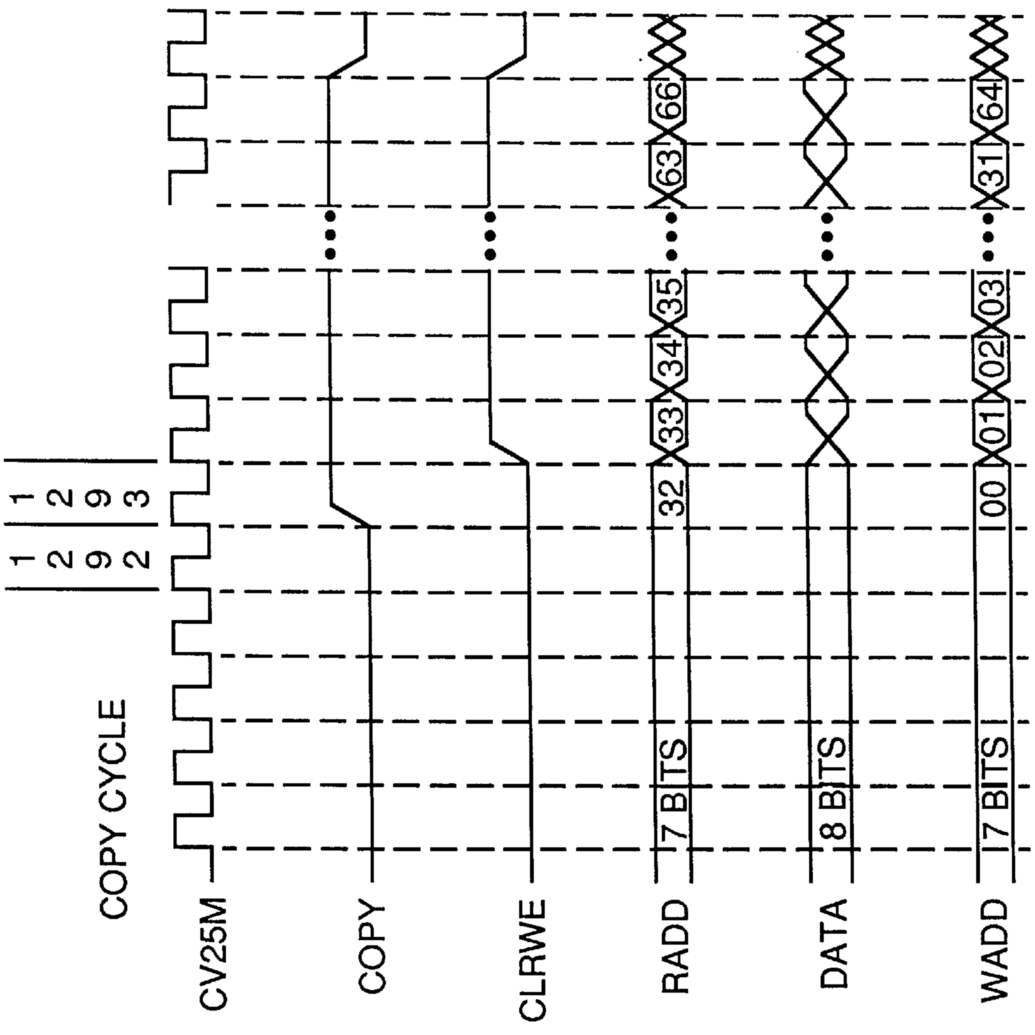
FIG. 14 is a timing diagram for a copy cycle.
Figure 15:
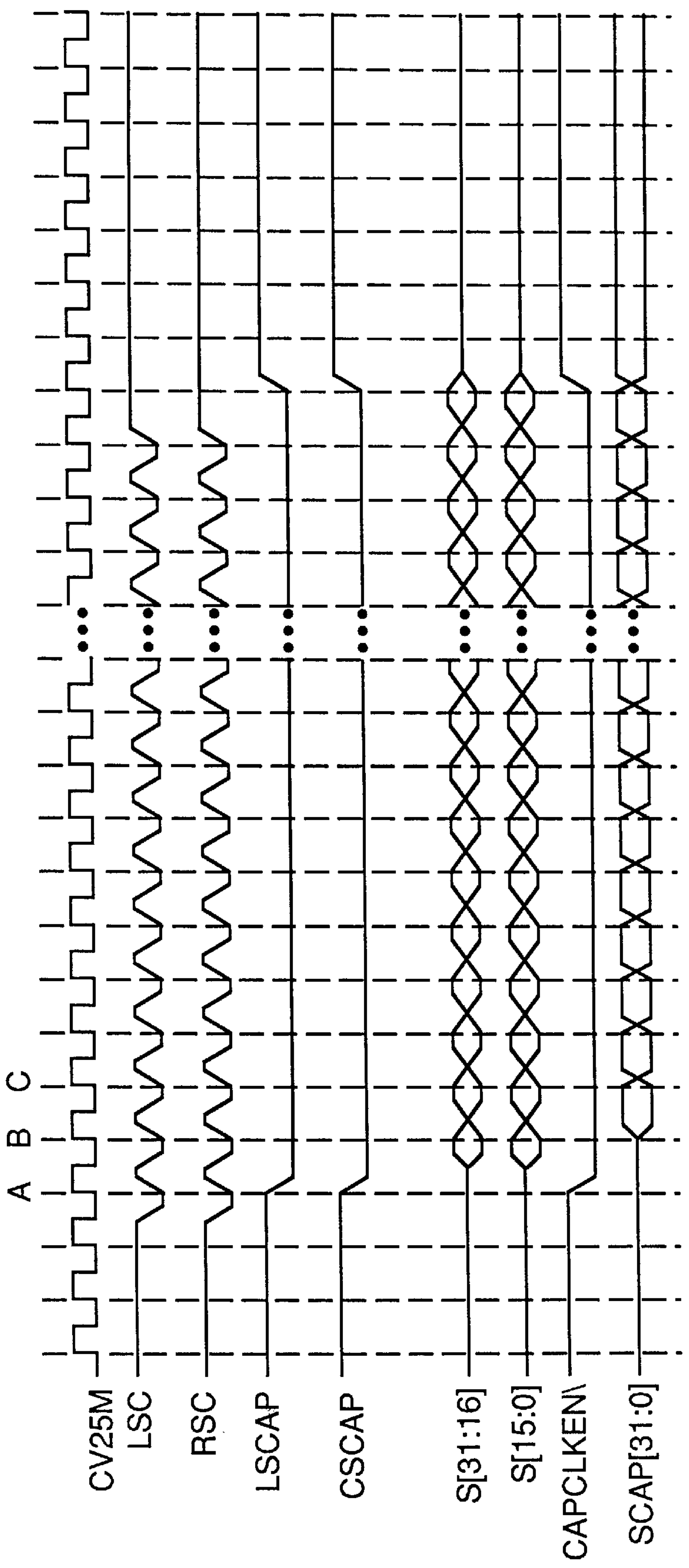
FIG. 15 is a timing diagram for a write cycle.
Figure 16:
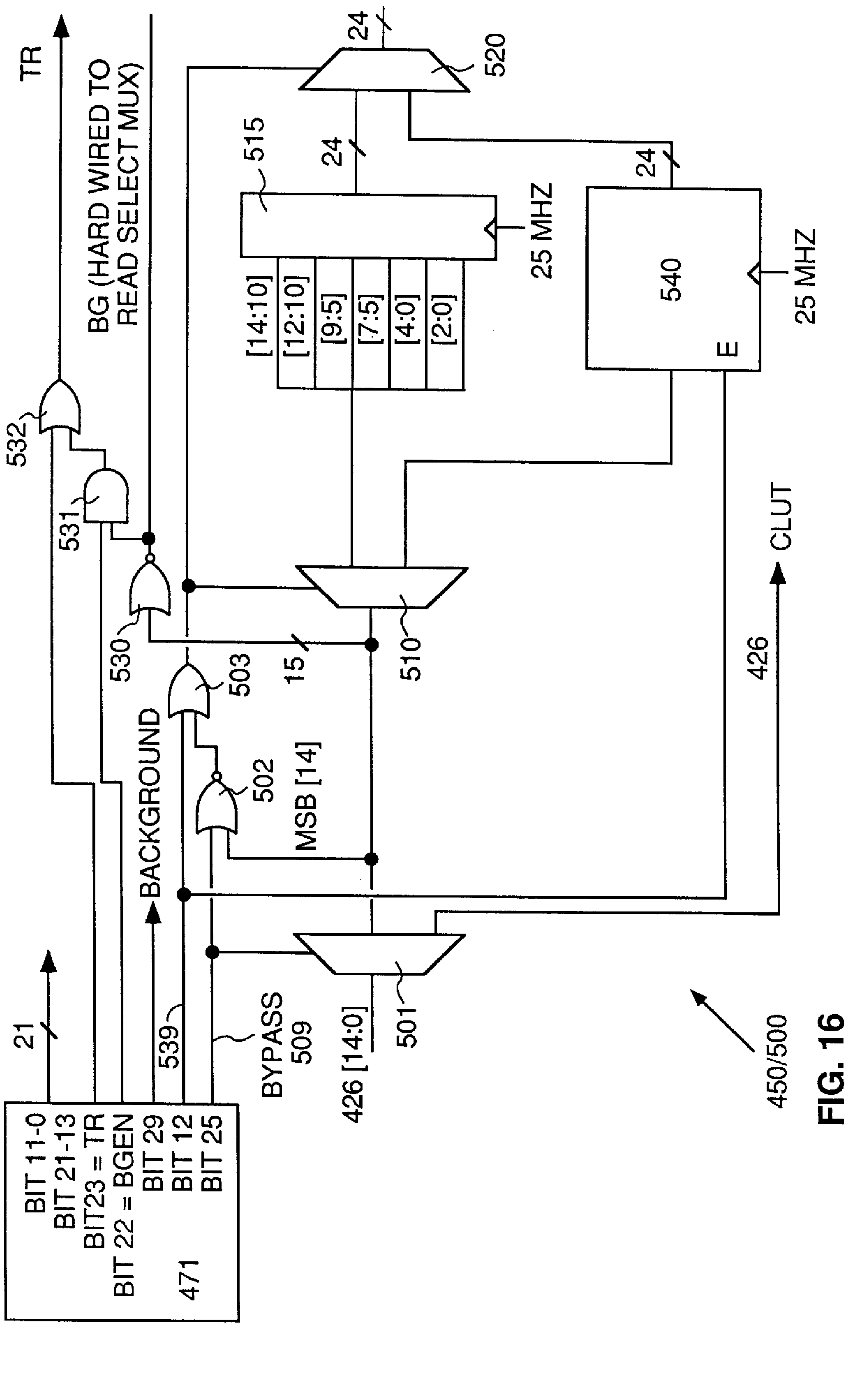
FIG. 16 is block diagram of the command and bypass units.

Referring to FIG. 12, a schematic view of red CLUT 210 is shown. The red CLUT 210 has arbitrarily been selected for a more detailed, but less cluttered explanation of CLUT operation. Referring to FIGS. 14, 15 and 16, timing diagrams for CLUT read, copy and load, respectively, are presented.

Each individual CLUT is 66×8 bits. The current portion 210c contains 32 8 bit words, the previous portion 210p also contains 32 8 bit words. One byte is provided for current background and one for previous background. Each CLUT has 7 address lines [6:0]. Five lines [4:0] are used to address current pixel data from locations 100000 to 111111. Six lines [6:0] are also used to access previous pixel data which is stored in location 000000 to 011111. The previous background level is stored at location 1000000 and the current background is stored at 100001.

In addition to the multiplexers shown in FIG. 8, a second layer of multiplexers proceeds each of the read 220–222 and write 230–232 address multiplexers. A set of these multiplexers 261–264 is shown for the red clut 210. The first of these multiplexers is 2-to-1 multiplexer 261. A first input line contains seven bits of address in which the most significant bit is 0, the second most significant bit is connected to the current/previous circuit 280 output and the remaining five address lines are Input [14:10]. A second input line has a most significant bit of 1 followed by a string of 0s and a least significant bit connected to the current/previous circuit 280 output. The first input line receives 5 bits of video pixel data and 1 bit indicated whether it is for a-previous or current pixel. The second input line gives the address of the background location. The least significant bit again designates previous or current. The selector for the multiplexer is the detected background signal output from 15-to-1 OR gate 530 of FIG. 16. Thus, if background is detected, the multiplexer 261 selects the background address. However, if background is not detected, the 5 bit video pixels address is selected. A register 265 is connected to the output of this multiplexer 261 to alleviate timing problems.

The next multiplexer 262 is used during the copy cycle and has one address to which is input 0, in the most significant bit, 1, in the second most significant bit and 5 bits of copy address signals generated from the copy control circuit 285. The second input line is hard wired to the current background address. This multiplexer is selected by the Switch signal from the copy control circuit 285.

The write multiplexer 230 is also proceeded by two multiplexers 263–264. Both of these are 2-to-1 multiplexers and the input to the first line of multiplexer 263 has 0 in the most significant bit, 1 in the second most significant bit and 5 address bits from a color palette word bits [28:24]. On the second input line is the hard wired address 1000001 which indicates the current background location. The select for this multiplexer 263 is the forced background, bit 29 of the display command word. The second multiplexer 264 has at its first input 00 in the two most significant bit locations and the 5 address bits from the copy control circuit 285. The second input line is hard wired to 1000000. The selector for this multiplexer is also the switch signal from the copy control circuit.

Figure 13:
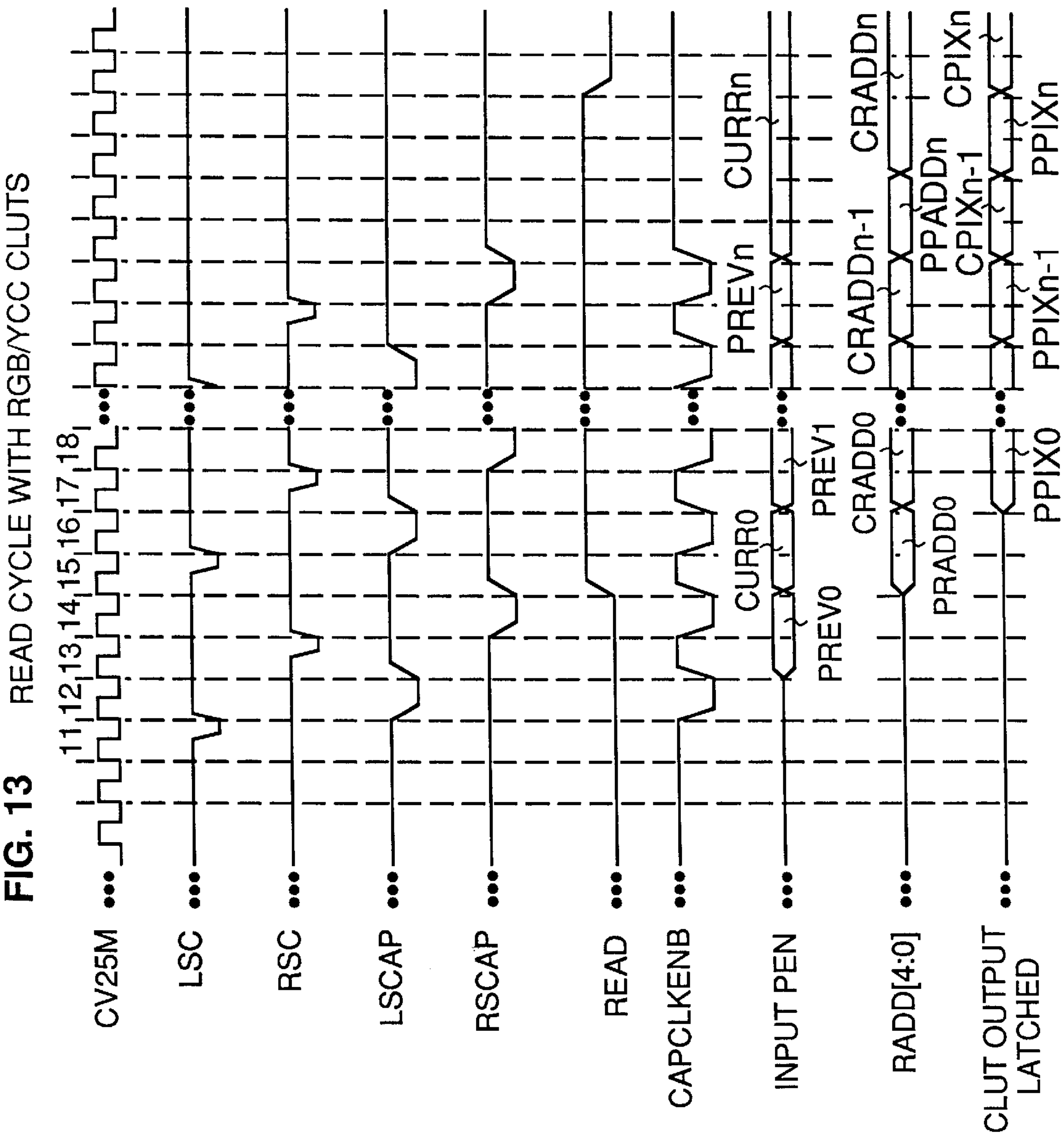
FIG. 13 is a timing diagram for a read cycle.

Referring to FIG. 13, a timing diagram for the read cycle is shown. The first signal illustrates the system clock, which operates at a frequency of 25 megahertz. The term "tick" has been used throughout this document to refer to one cycle of this clock. The next three signals CHS, H-start, PCSC were described above with reference to the synchronizations and horizontal counter unit 50. They are provided here to show continuity and illustrate the beginning of a read operation. The first LSC or RCS is sent during the eleventh tick and latched during the twelfth tick as LSCAP or RSCAP. For purposes of illustration, it will be assumed that LSC has been transmitted first, and therefore, occurs during tick eleven. LSCAP is generated in response to LSC and in turn generates CAPCLKEN. Referring to the previous/current circuit 280 above, CAPCLKEN drives the output of gate 281 low to indicate that a previous pixel is present. This output signal is held low for two clock cycles as indicated in FIG. 14. The fifteen bit Input [14:0] is captured during the same period current/previous is generated. Two ticks later, the signals are presented to the CLUTs 210–212 and two ticks thereafter, the 8 bit expanded value of each 5 (or 4 for blue) bit input is present at the output of each CLUTs 210–212. The two tick delay between latching the input pen and the arrival of this signal at the CLUT is to permit a determination of current or previous.

Referring to FIG. 14, a timing diagram for the copy cycle is shown. This figure is best understood when considered in combination with the copy control circuit 285 of FIG. 11. The copy enable signal is triggered during cycle 1293. This signal is sent to the copy control circuit 285 and output therefrom to the read, write and data multiplexers 220–222, 230–232, 240–242 to select the appropriate address and data input lines, during the "copy" period (ticks 1293–1339). The first address for the copy operation is generated by the copy counter 286 which starts at 00000. The next most significant bit, as mentioned above, is hard wired high at the read address multiplexer and low at the write address multiplexer. Therefore, at the positive edge of tick 1294, the contents of memory location 100000 is written to location 000000 which, in decimal, is from location 32 to location 0. During the positive edge of the next tick, the contents of location decimal 33 is written to location decimal 1 and this process is repeated until both the current CLUT and the current background are written to the previous CLUT and background, respectively, terminating at tick 1326.

Following a CLUT copy, each of the CLUTs 210–212 is ready to accept new color palette data during a load cycle which is illustrated in FIG. 15. During the load cycle, LSC and RSC are sent simultaneously each clock tick to transfer a 32 bit color palette data word every tick. The occurrence of LSC and RSC trigger LSCAP and RSCAP to go low which in turn drives low CAPCLKEN. CAPCLKEN is connected to the inhibit of the two capture registers 420, 421 of FIG. 6. When the inhibit active high is at a logic low, the capture register 420, 421 is enabled to latch the signals on line 411 and 412 at every positive edge of the system clock. The latched data is valid during the next clock cycle as SCAP[31:0] which is propagated to the CLUT 200. Note, however, that if bit 31 is a 1, then SCAP [29:0] will be latched by the display control registers 470, 471.

Referring to FIG. 15, a timing diagram for a "write" or "load" cycle is shown. Since a 32 bit word is sent during a CLUT download, LSC and RSC are sent simultaneously from the address manipulator 115. On a positive end of clock pulse A, LSC and RSC are gated and become LSCAP and RSCAP, respectively, which, in turn, create CAPCLKEN. Since LSC and RSC are sent every clock pulse, LSCAP and RSCAP are held low for the entire period of the write enabling the left-side and right-side capture registers 420, 421 for that same period. As a result of their enabled condition, the left and right side capture registers will capture the data at their inputs on the occurrence of each positive edge of the clock signal. At a next clock cycle B, the first 32 bit word is captured by the registers 420,421 and at a clock cycle C, this word is available as SCAP [31:0] for either the CLUT 200 or a command register 470,471. This process is repeated for each subsequent transfer when LSC and RSC are received simultaneously.

Referring to FIG. 16, a schematic diagram of the display command unit 450 and the bypass unit 500 is shown. The display command register 471 has a plurality of output lines, defined above. A portion of these lines 0–11, 13–21 and 23 are output directly to the interpolator 150 and do not impact the CCU 250.

Starting with the most significant bits, bit 29 is the background enable bit. It is connected to the multiplexer select line as disclosed above (not shown). Bit 28 is output to the audio/video output circuit 152 control register 470 to disable its output line. Bit 25 is the CLUT bypass enable. It is connected by line 509 to demultiplexer 501 which selects whether the Input [14:0] is input over line 426 to the CLUT or bypasses the CLUT 200. Line 509 is also input to a NOR gate 502. The other input of this NOR gate 502 is the most significant bit of Input [14:0]. When these two signals are both active, a logic low, is output from gate 502 which propagates through OR gate 503 to select the replicator output of demultiplexer 510.

When video pixel data is passed through a CLUT 200, the CLUT expands it from 15 to 24 bits. Since bypass data is not passed through a CLUT 200, alternate means are provided for such an expansion. The replicator 515 functions by effectively shifting the bits, in each of the five bits of pixel data, three places towards most significant and copying the original three bits of least significance into the newly created three bits of least significance. This is performed by simply splicing off the three least significant bits of each 5 bits pixel data as indicated in FIG. 13. The output of replicator 515 is now 24 bits.

Bit 23 forces transparency and is connected to the audio/video output circuit 152. Transparency refers, in a usual implementation, to a state in which a portion of the image displayed on monitor 160 is overlaid with a window of image data from another source or from the same source, but displaying another image. The pixel data for the portion to be overlaid is forced to a transparent level and overlay image data is sent to the transparent portion (although the transparent portion could be left transparent, i.e., filled with a background color, to create a window). Note that the source of overlay data is specified in register 471 (bit 24). In addition to being forced by bit 23, transparency may also be enabled if two conditions are present. The first is if the contents of all of lines [14:0] are zero. This is detected by 15 input NOR gate 530. The second is if the background enable, bit 22 is set. If these two conditions are true, the output of AND gate 531 propagates through OR gate 532 to force transparency, regardless of bit 23.

Bit 12 is the enable of an alternate data expansion mechanism 540 and is provided to illustrate that alternate mechanisms may be used to expand video data, for example, from 5 to 8 bits/color. To implement such a mechanism, an enable signal is propagated over line 539 to an enable of the mechanism 540. The signal on line 539 is also sent to gate 507 and used to select the appropriate multiplexer 520 input.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

That which is claimed is:

1. A video data color conversion apparatus for converting a first stream of color video data received from a first data source in a first format the first stream of color video data representing a first multi-line image to be displayed on a raster-type display means that uses a second different format the second format including horizontal scan periods and horizontal blanking periods, said conversion apparatus comprising:

(a) video output circuit means for driving the display means the video output circuit means including means for supplying horizontal synch signals to the display means to define the beginnings of the horizontal scan periods;

(b) programmable color look up table means (CLUT means), positioned upstream of the video output circuit means for converting, during a conversion time span corresponding to a horizontal scan period, an input video data signal having the first format into a converted signal having a third format according to color conversion data loaded into the CLUT means, and for forwarding the converted signal downstream to the video output circuit means;

(c) timing means, operatively coupled to the video output circuit means and responsive to the horizontal synch signals, for generating update synchronization signals corresponding at least approximately to the start and end of each of the horizontal blanking periods of the display means; and (d) updating means, responsive to said update synchronization signals and operatively coupled to said CLUT means, for updating said color conversion data in said CLUT means during an update period corresponding to one of said horizontal blanking periods.

2. The apparatus of claim 1, wherein said CLUT means comprises a plurality of individual color CLUTs of said individual color CLUTs being programmably loadable with a respective plurality of video conversion data entries; and wherein said updating means is capable of selectively updating a prespecified subset of said plurality of video conversion data entries in a prespecified one of said plurality of individual color CLUTs during said update period.

3. The apparatus of claim 2, wherein said updating means is also capable of updating all of said plurality of video conversion data entries in all of said plurality of individual color CLUTs during said update period.

4. The apparatus of claim 1, wherein:

an image enhancing means is interposed between the CLUT means and the video output circuit means for enhancing the converted signal prior to supplying said converted signal to the video output circuit means, said image enhancing means using portions of first and second image lines of the converted signal to perform its image enhancing function;

said CLUT means comprises a plurality of buffers, including a first CLUT buffer for storing first conversion data for converting input video data belonging to the first image line and a second CLUT buffer for storing second conversion data for converting input video data belonging to the second image line.

5. The apparatus of claim 4, wherein each of said first and second CLUT buffers includes a plurality of individual color CLUTs, each of said individual color CLUTs having a plurality of video conversion data entries.

6. The apparatus of claim 4 wherein the updating means includes:

(d.1) copying means, operatively coupled to the first and second CLUT buffers, for copying the contents of one of said first and second CLUT buffers to the other of said first and second CLUT buffers; and (d.2) write means for revising, after said copying, the video conversion data in said one CLUT buffer from which said contents had been copied to the other of the CLUT buffers.

7. The apparatus of claim 1, wherein:

said color conversion data includes first, generally-addressable data representing a plurality of foreground colors and second specially-addressable data representing one or more background color values; and said CLUT means includes background-detect means for detecting a prespecified special address condition that indicates a request for the one or more background color values in place of the generally-addressable foreground colors.

8. The apparatus of claim 1 wherein the first data source dispenses command data during the horizontal blanking periods, said apparatus further comprising:

(e) command capture means operatively coupled to the first data source for capturing the dispensed command data the command capture means including;

(e.1) transparency-indicating means for generating an indication that a corresponding portion of said input video data signal is to be overlaid prior to display by an alternate image signal thereby causing said corresponding portion of the video data signal to appear transparent in the display projection.

9. The apparatus of claim 1 wherein the first data source supplies the first stream of color video data by way of a supply bus such that the first stream is time-multiplexed to allow a time-multiplexed interlacing onto the same supply bus of a second stream of color video data having a fourth format said apparatus further comprising:

(e) routing means coupled to the supply bus, for routing the first stream of color video data to the display means by way of the CLUT means, and for routing the second stream of color video data to the display means by a way that circumvents the CLUT means.

10. The apparatus of claim 9 wherein:

the video output circuit means includes overlay means, responsive to a transparency-indicating signal, for substituting in place of a first image portion represented by the converted signal received from the CLUT means, a second image portion represented by the second stream of color video data in the case where the first image portion of the converted signal is accompanied by a transparency-indicating signal that is set true; and the routing means includes transparency means for tagging at least a portion of said first stream of color video data as being transparent, such tagging causing the tagged portion to be replaced in the video output circuit means by a corresponding portion of the second stream of color video data.

11. The apparatus of claim 10, wherein said second stream of color video data is propagated through said apparatus in real-time alignment with the first stream of color video data such that each portion of the first stream of color video data that is tagged as transparent by an accompanying transparency-indicating signal is replaced by a corresponding time-aligned portion of the second stream of color video data.

12. The apparatus of claim 1, further comprising:

(e) alternate conversion means for converting a data stream having the first format into a converted data stream having the third format in accordance with a predefined conversion scheme; and (f) bypass means for causing said input video data signal to bypass said CLUT means at desired times and instead pass through the alternate conversion means.

13. The apparatus of claim 1 further comprising:

(e) a supply bus for conveying the input video data signal downstream from the first data source to the CLUT means and for further conveying configuration control and update data streams, the conveyed data streams including CLUT configuration control data for programmably configuring the CLUT means and VOC configuration control data for programmably configuring the video output circuit means;

wherein said CLUT means includes first control register means for capturing and storing CLUT configuration control data conveyed over the supply bus; and wherein said CLUT means further includes second control register means for capturing and storing the VOC configuration control data conveyed over the supply bus and for forwarding the captured VOC configuration control data downstream to the video output circuit means.

14. The apparatus of claim 13, wherein one of the conveyed data streams further includes CLUT update data for updating said color conversion data loaded into the CLUT means.

15. In a computer system for use with a video display, including an image processing unit coupled by way of a data bus to a system memory, the image processing unit being for modifying prior to display, image data that is pre-stored within the system memory; wherein video data is driven in synchronism with a system video clock through a video data path from said system memory to said display, a video data conversion apparatus located along said video data path, comprising:

color look up table means (CLUT means) for converting an input video data signal according to variable color conversion data loaded into said CLUT means;

timing means for determining when horizontal blanking periods of said video display occur; and updating means, responsive to the timing means and coupled to the CLUT means for updating said color conversion data in said CLUT means during one of said horizontal blanking periods.

16. The apparatus of claim 15, wherein said CLUT means comprises:

a plurality of individual color CLUTs, each of said individual color CLUTs being programmably loadable with a respective plurality of video conversion data entries; and wherein said updating means is capable of selectively updating a prespecified subset of said plurality of video conversion data entries.

17. The apparatus of claim 15, wherein:

an image enhancing means is interposed between the CLUT means and the video display for enhancing the converted input signal prior to supplying said converted input signal to the video display, said image enhancing means using portions of first and second image lines of the converted input signal to perform its image enhancing function; and said CLUT means comprises a plurality of buffers, including separately programmable first and second CLUT buffers, a combination of converted signals from each of the first and second buffers being conveyed to the image enhancing means.

18. The apparatus of claim 17 wherein said updating means includes:

means for copying the contents of one of said first and second CLUT buffers to the other of said first and second CLUT buffers during one of said horizontal blanking periods.

19. The apparatus of claim 15, wherein:

said color conversion data includes first, generally-addressable data representing a plurality of foreground colors and second specially-addressable data representing one or more background color values; and said CLUT means includes background-detect means for detecting a prespecified special address condition that indicates a request for the one or more background color values in place of the generally-addressable foreground colors.

20. The apparatus of claim 15, wherein the system memory dispenses command data during the horizontal blanking periods, said apparatus further comprising:

command capture means operatively coupled to the system memory for capturing the dispensed command data the command capture means including:

transparency-indicating means for generating an indication that a corresponding portion of said input video data signal is to be overlaid prior to display by an alternate image signal thereby causing said corresponding portion of the video data signal to appear transparent in the display projection.

21. The apparatus of claim 15 wherein the system memory supplies a first stream of color video data to the CLUT means by way of a supply bus, the first stream being time-multiplexed to allow a time-multiplexed interlacing onto the same supply bus of a second stream of color video data having a fourth format, said apparatus further comprising:

routing means, coupled to the supply bus, for routing the first stream of color video data to the display by way of the CLUT means, and for routing the second stream of color video data to the video display by a way that circumvents the CLUT means.

22. The apparatus of claim 15, further comprises:

alternate conversion means for converting a data stream having a first format into a converted data stream having a second format in accordance with a predefined conversion scheme: and bypass means for causing said input video data signal to bypass said CLUT means at desired times and instead pass through the alternate conversion means.

23. A method for displaying video imagery on a display means having horizontal blanking periods, the imagery being initially represented by digital input video data, said method comprising the steps of:

(a) converting said input video data using a programmable color look up table means (CLUT means);

(b) identifying a start point and end point in time for at least one of the horizontal blanking periods of said display means; and (c) updating said CLUT means between the identified start and end points of the at least one horizontal blanking period.

24. The method of claim 23, further comprising the steps of:

(d) providing a plurality of individually-programmable color CLUTs within said CLUT means;

(e) storing a plurality of video data conversion entries in each of said color CLUTs; and wherein said updating step includes the step of:

(c.1) selectively updating a subset of the stored color conversion entries.

25. The method of claim 23, further comprising the steps of:

(d) providing first and second CLUT buffers within the CLUT means [200] for respectively storing current-line conversion data and previous-line conversion data;

(e) loading the first and second CLUT buffers respectively with current-line conversion data and previous-line conversion data;

(a.1) wherein said step of converting includes using the loaded current-line conversion data and previous-line conversion data respectively for converting a corresponding current-line portion and previous-line portion of the imagery initially represented by the input video data: and wherein said method further comprises the step of:

(f) combining converted data output from said first and second CLUT buffers to generate a display image having a resolution that is enhanced relative to that of the imagery initially represented by the input video data.

26. The method of claim 23, further comprising the steps of:

storing data representative of a background color in said CLUT means and when a predefined input condition occurs, retrieving the background color in place of a plurality of normally-used foreground color values.

27. The method of claim 23, further comprising the steps of:

generating an indication that a first portion of said initially represented imagery is to be overlaid prior to display by an alternate image portion; and in response to the generated indication overlaying the first portion with the alternate image portion thereby causing the first portion of said initially represented imagery to become transparent in the displayed video imagery.

28. The method of claim 23, further comprising the steps of:

supplying a first stream of color video data to the CLUT means by way of a supply bus, the first stream being time-multiplexed to allow a time-multiplexed interlacing onto the same supply bus of a second stream of color video data;

interlacing the second stream of color video data onto the supply bus;

routing the first stream of color video data to the display means by way of the CLUT means;

simultaneously routing the second stream of color video data to the display means by way of a path that bypasses the CLUT means.

29. The method of claim 28, comprising the steps of:

causing a portion of one of said first and second data streams to be transparent; and causing a portion of one of said data streams which does not have a portion of transparent data to be projected in place of said portion of data which has been caused to be transparent.

30. The method of claim 23, further comprising the step of:

providing an alternate conversion means and bypassing said CLUT means with said input video data and instead passing the input video data through the alternate conversion means.

31. A method for use in a computer system that produces video signals for display on a video display means having horizontal blanking periods, said system including an image processing unit coupled by way of a data bus to a system memory, the image processing unit being for modifying prior to display, image data that is pre-stored within the system memory; wherein video data is driven in synchronism with a system video clock through a video data path from said system memory to said display means, said method comprising the steps of:

(a) converting input video data into converted video data using a color look up table means (CLUT means);

(b) identifying a start point and end point in time for at least one of the horizontal blanking periods of said display means; and (c) updating said CLUT means between the identified start and end points of the at least one horizontal blanking period.

32. The method of claim 31, further comprising the steps of:

(d) providing a plurality of individually-programmable color CLUTs within said CLUT means;

(e) storing a plurality of video data conversion entries in each of said color CLUTs; and wherein said updating step includes the step of:

(c.1) selectively updating a subset of the stored color conversion entries.

33. The method of claim 31, further comprising the steps of:

(d) providing first and second CLUT buffers within the CLUT means for respectively storing current-line conversion data and previous-line conversion data;

(e) loading the first and second CLUT buffers respectively with current-line conversion data and previous-line conversion data;

(a.1) wherein said step of converting includes using the loaded current-line conversion data and previous-line conversion data respectively for converting a corresponding current-line portion and previous-line portion of imagery initially represented by the input video data; and wherein said method further comprises the step of:

(f) combining converted data output from said first and second CLUT buffers to generate a display image having a resolution that is enhanced relative to that of the imagery initially represented by the input video data.

34. The method of claim 31, further comprising the steps of:

storing data representative of a background color in said CLUT means and when a predefined input condition occurs, retrieving the background color in place of a plurality of normally-used foreground color values.

35. The method of claim 31, comprising the steps of:

generating an indication that a first portion of initial imagery represented by said pre-stored image data is to be overlaid prior to display by an alternate image portion: and in response to the generated indication overlaying the first portion with the alternate image portion thereby causing the first portion of said initial imagery to become transparent in displayed video imagery of said video display means.

36. The method of claim 31, further comprising the steps of:

supplying a first stream of color video data to the CLUT means by way of a supply bus the first stream being time-multiplexed to allow a time-multiplexed interlacing onto the same supply bus of a second stream of color video data;

interlacing the second stream of color video data onto the supply bus;

routing the first stream of color video data to the display means by way of the CLUT means;

simultaneously routing the second stream of color video data to the display means by way of a path that bypasses the CLUT means.

37. The method of claim 36, comprising the steps of:

causing a portion of one of said first and second data streams to be transparent; and causing a portion of one of said data streams which does not have a portion of transparent data to be substantially projected in place of said portion of data which has been caused to be transparent.

38. The method of claim 31, further comprising the step of:

providing an alternate conversion means; and bypassing said CLUT means with said input video data and instead passing the input video data through the alternate conversion means.

39. A video data color conversion apparatus, comprising:

(a) color look up table means (CLUT means) for converting at substantially the same time, first and second input video data respectively representing pixels of successive first and second scan lines of a video image, said CLUT means having a first CLUT buffer for storing first conversion data for converting the first input video data and a second CLUT buffer for storing second conversion data for converting the second input video data; and means for loading the first color conversion data into said first CLUT buffer and for loading the second color conversion data into said second CLUT buffer.

40. The apparatus of claim 39, further comprising:

time-multiplexing means for sequentially supplying, in an alternating manner to the first and second CLUT buffers, first input video data representing a first pixel from said first scan line, and second input video data representing a second pixel from said second scan line.

41. An apparatus for converting color scan line data before said data is displayed on a display, said display being a raster-type display that projects a frame of converted image data at a time, each frame being comprised of a plurality of successive scan lines, said apparatus comprising:

(a) programmable color look up table means (CLUT means) for storing color conversion data and for converting at substantially the same time, scan line data for a plurality of successive scan lines, each scan line being converted in accordance with color conversion data pre-defined specifically for that scan line and stored as such in the CLUT means; and (b) programmable updating means for individually updating said color conversion data in said CLUT means for a first programmably-specified scan line of a given display frame and for another programmably-specified scan line within the same given display frame.

42. An apparatus for converting received scan line data for a plurality of scan lines before said plural scan lines are displayed on a display, said display being a raster-type display that projects a frame of converted scan line data at a time, each frame being comprised of a plurality of successive scan lines, said apparatus comprising:

(a) programmable color look up table means (CLUT means) for storing color conversion data and for converting input scan line data for a plurality of successive scan lines, each scan line being converted in accordance with conversion data pre-defined specifically for that scan line and stored as such in the CLUT means; and (b) programmable updating means for selectively and individually updating said conversion data in said CLUT means for each of said plurality of successive scan lines, said selective updating being programmably-specified either for one or for a group of successive scan lines.

43. A method for converting color scan line data before display, comprising the steps of:

(a) converting a digital first input video signal representing a first pixel in a first scan line in accordance with first color conversion data stored in a color look up table (CLUT) for said first scan line;

(b) converting a digital second input video signal representing a second pixel in a second scan line immediately sequentially following said first scan line in accordance with second color conversion data stored in said CLUT for said second scan line; and (c) outputting the converted first and second video signals at substantially the same time for consumption by a downstream signal processing means that uses both of the first and second video signals at substantially the same time to perform a downstream signal processing function;

wherein said first color conversion data and second color conversion data are different.

44. The method of claim 43, wherein said step of outputting the converted first and second video signals includes:

sequentially propagating through a time-multiplexed data path said converted first video input signal for said first scan line and said converted second video input signal for said second scan line.

45. A method for converting received color scan line data before said data is displayed on a display, said display being a raster-type display that projects a frame of converted image data at a time, each frame being comprised of a plurality of successive scan lines, said method comprising the steps of:

(a) storing plural sets of color conversion data in a programmable color look up table means (CLUT means), each set corresponding to a unique group of one or more scan lines in a given frame;

(b) using the CLUT means for converting at substantially the same time, the received scan line data of a plurality of scan lines, each in accordance with the set of color conversion data stored for that scan line;

(c) updating a first set of said stored color conversion data for a first scan line of a given frame; and (d) updating a second set of said stored color conversion data for another scan line within the same given frame.

46. A method for converting input data representing multi-colored pixels in a plurality of successive scan lines in a frame before display, comprising the steps of:

(a) storing plural sets of color conversion data in a programmable color look up table means (CLUT means) each set corresponding to a unique group of one or more scan lines in a given frame;

(b) converting input data for a plurality of successive scan lines in accordance with the corresponding sets of color conversion data stored in the color look up table means (CLUT means); and (c) selectively updating a subset of one of the sets of said color conversion data stored in the CLUT means.

47. The method of claim 46, wherein said step of storing the color conversion data further comprises:

(a.1) subdividing each set of stored color conversion data into color-component subsets with each color-component subset representing a unique color component of the corresponding display pixels; and wherein said step of selectively updating includes:

(c.1) selectively updating one of the color-component subsets stored in the CLUT means.

48. The apparatus of claim 1, wherein said CLUT means converts an input video data signal having less than twenty-four (24) bits of color information per pixel into a converted signal having at least twenty-four (24) bits of color information per pixel.

49. The apparatus of claim 1, wherein said input video data signal includes a plurality of color-component fields each representing a unique color-component ,wherein each color-component field has less than eight (8) bits of color information per color-component, and wherein said CLUT means converts each color-component field into an expanded color-component field having at least eight (8) bits of color information to represent its corresponding color-component.

50. A digital video conversion system for receiving a first stream of color video data from a first data source , where the first stream of color video data has pixel data of a first format, the first-formatted pixel data representing a first multi-line image having a first number of bits per pixel, the system further being for converting the first stream of color video data into a second stream of color video data that has a pixel data of a second different format, the second-formatted pixel data representing a second multi-line image having a second different number of bits per pixel, said digital video conversion system comprising:

(a) first programmable color look up table means (first CLUT means) for storing first conversion data and using the first conversion data for converting, in a predefined one or more time periods, first-formatted pixel data from a programmably assigned first group of one or more lines in the first image into converted first pixel data having the second format;

(b) second programmable color look up table means (second CLUT means) for storing second conversion data and using the second conversion data for converting, in substantially the same one or more predefined time periods, first-formatted pixel data from a programmably assigned second group of one or more lines in the first image into converted first pixel data having the second format; and (c) routing means, operatively coupled to the first and second CLUT means for receiving the first stream of color video data, and for routing respective portions thereof that represent the first-formatted pixel data from the programmably assigned first group of one or more lines to the first CLUT means, and for further routing respective portions of the first stream of color video data that represent the first-formatted pixel data from the programmably assigned second group of one or more lines to the second CLUT means.

51. A digital video conversion system according to claim 50 wherein the first data source alternatingly supplies first-formatted pixel data representing pixels of first and second lines of the first multi-line image and wherein the routing means synchronously routes the alternatingly-supplied pixel data respectively to the first and second CLUT means.

52. A digital video conversion system for receiving a first stream of color video data from a first data source , where the first stream of color video data has pixel data of a first format, the first-formatted pixel data representing a first multi-line image having a first number of bits per pixel, the system further being for converting the first stream of color video data into and outputting a second stream of color video data that has a pixel data of a second different format, the second-formatted pixel data representing a second multi-line image having a second different number of bits per pixel, said digital video conversion system comprising:

(a) programmable first conversion means for storing programmably-defined first conversion data and using the stored first conversion data for converting, in a predefined one or more time periods, first-formatted pixel data from a programmably assigned first group of one or more lines in the first image into converted first pixel data having the second format;

(b) alternative second conversion means for alternatively converting, in substantially the same one or more predefined time periods and in accordance with an alternate conversion scheme that is independent of the first conversion data, the first-formatted pixel data from the programmably assigned first group of one or more lines in the first image into converted first pixel data having the second format; and (c) selection means, operatively coupled to the first and second conversion means, for selecting one or the other of the first and second conversion means as the means that outputs its corresponding converted first pixel data as at least part of the second-formatted pixel data having the second format.

53. A digital video conversion system according to claim 58 wherein:

(a.1) the first conversion means includes programmable third conversion means for storing programmably-defined second conversion data and for using the stored second conversion data for converting, substantially during said predefined one or more time periods, first-formatted pixel data from a programmably assigned second group of one or more lines in the first image into converted second pixel data having the second format;

(b.1) the alternative second conversion means is operatively coupled to alternatively convert, substantially during said predefined one or more time periods and in accordance with the alternate conversion scheme, the first-formatted pixel data from the programmably assigned second group of one or more lines in the first image into converted second pixel data having the second format; and (c.1) the selection means is further for selecting one or the other of the first and second conversion means as the means that outputs its corresponding converted second pixel data as at least part of the second-formatted pixel data having the second format.

54. A digital video conversion system according to claim 58 wherein:

(c.1) the selection means includes line-by-line programmable means for selecting one or the other of the first and second conversion means on a line-by-line basis as the means that outputs its corresponding converted first pixel data as at least part of the second-formatted pixel data having the second format.

55. A digital video conversion system according to claim 58 wherein:

(c.1) the selection means includes pixel-by-pixel programmable means for selecting one or the other of the first and second conversion means on a pixel-by-pixel basis as the means that outputs its corresponding converted first pixel data as at least part of the second-formatted pixel data having the second format.

56. A digital video conversion system according to claim 52 wherein:

(b.1) the second number of bits per pixel is greater than the first number of bits per pixel; and (b.2) the alternate conversion scheme of the alternative second conversion means replicates a predetermined number of bits from a predefined portion of the first-formatted pixel data and appends the replicated portion onto the first-formatted pixel data in order to produce a signal having the second number of bits per pixel.

57. A digital video conversion system according to claim 52 wherein:

(b.1) the second number of bits per pixel is greater than the first number of bits per pixel; and (b.2) the alternate conversion scheme of the alternative second conversion means appends a predetermined number of pseudo-randomly generated bits onto the first-formatted pixel data in order to produce a signal having the second number of bits per pixel.

58. A digital video conversion system for receiving a first stream of input color video data from a first data source, where the first stream of input color video data has pixel data of a first format, the first-formatted pixel data representing a first multi-line image having a first number of bits per pixel subdivided into plural color-component fields each representing a color component of a corresponding input pixel, the system further being for converting the first stream of color video data into and outputting a second stream of output color video data that has pixel data of a second different format, the second-formatted pixel data representing a second multi-line image having a second different number of bits per pixel subdivided into further plural color-component fields each representing a color component of a corresponding output pixel, said digital video conversion system comprising:

(a) programmable first conversion means for storing programmably-defined first conversion data and accessing the stored first conversion data for converting, in a predefined one or more time periods, a first color-component field of first-formatted pixel data from a programmably assigned first group of one or more lines in the first image into a converted first color-component field to be output as part of converted pixel data having the second format;

(b) programmable second conversion means for storing programmably-defined second conversion data and independently accessing the stored second conversion data for converting, in substantially the same predefined one or more time periods, a second color-component field of first-formatted pixel data from the programmably assigned first group of one or more lines in the first image into a converted second color-component field to be output as part of converted pixel data having the second format; and (c) programmable third conversion means for storing programmably-defined third conversion data and independently accessing the stored third conversion data for converting, in substantially the same predefined one or more time periods, a third color-component field of first-formatted pixel data from the programmably assigned first group of one or more lines in the first image into a converted third color-component field to be output as part of converted pixel data having the second format.

59. A digital video conversion system according to claim 58 further comprising:

(d) background substitution means for detecting a unique pattern of bit settings present simultaneously across the color-component fields of the input pixel data and for substituting, upon detection of said unique pattern, a set of predefined background signals as said converted first through third color-component fields in place of the converted first through third color-component fields that would be otherwise output respectively by the programmable first through third conversion means.

60. A digital video conversion system according to claim 59 wherein the set of predefined background signals are programmably defined and stored in a memory means.

61. A digital video conversion system according to claim 60 wherein the set of predefined background signals that are programmably defined and stored in said memory means are modifiable on a line-by-line basis.

* * * * *